(12) United States Patent
Kakutani et al.

(10) Patent No.: US 6,545,770 B2
(45) Date of Patent: *Apr. 8, 2003

(54) DOT RECORDING METHOD AND DOT RECORDING APPARATUS

(75) Inventors: Toshiaki Kakutani, Nagano-ken (JP); Kazumichi Shimada, Nagano-ken (JP); Munehide Kanaya, Nagano-ken (JP); Hisanori Nakajima, Nagano-ken (JP); Toyohiko Mitsuzawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/038,651

(22) Filed: Jan. 8, 2002

(65) Prior Publication Data

US 2002/0063873 A1 May 30, 2002

Related U.S. Application Data

(63) Continuation of application No. 09/194,435, filed as application No. PCT/JP98/01605 on Apr. 7, 1998.

(30) Foreign Application Priority Data

Apr. 8, 1997 (JP) .............................................. 9-106735
Apr. 6, 1998 (JP) ........................................... 10-110223

(51) Int. Cl.⁷ .............................................. G06F 13/00
(52) U.S. Cl. ....................... 358/1.7; 358/1.12; 358/1.13
(58) Field of Search ................................. 358/1.7, 1.12, 358/1.13, 1.14; 347/5, 9, 12, 13, 20, 37, 40, 42, 47, 57

(56) References Cited

U.S. PATENT DOCUMENTS

| 4,741,634 A | * | 5/1988 | Nozaki et al. | 400/120 |
| 6,099,102 A | * | 8/2000 | Tanaka et al. | 347/9 |
| 6,149,264 A | * | 11/2000 | Hirabayayashi et al. | 347/43 |
| 6,356,358 B1 | * | 3/2002 | Kakutani et al. | 358/1.7 |

* cited by examiner

Primary Examiner—Mark Wallerson
(74) Attorney, Agent, or Firm—Oblon, Spivak, McClelland, Maier & Neustadt, P.C.

(57) ABSTRACT

A specific image is first recorded according to a plurality of dot recording schemes which have an identical resolution and which are different at least in sub-scan feed operations. Then a desired dot recording scheme is selected corresponding to a desired recorded image which has been selected out of a plurality of recorded images recorded according to the plurality of dot recording schemes, and scheme selection information for specifying the desired dot recording scheme is stored into a rewritable non-volatile memory. In actual image recording, the scheme selection information stored in the non-volatile memory is read out, and a desired image is recorded on a recording medium according to the desired dot recording scheme specified by the scheme selection information.

14 Claims, 26 Drawing Sheets

Fig. 5(A) ARRANGEMENT OF NOZZLE ARRAYS
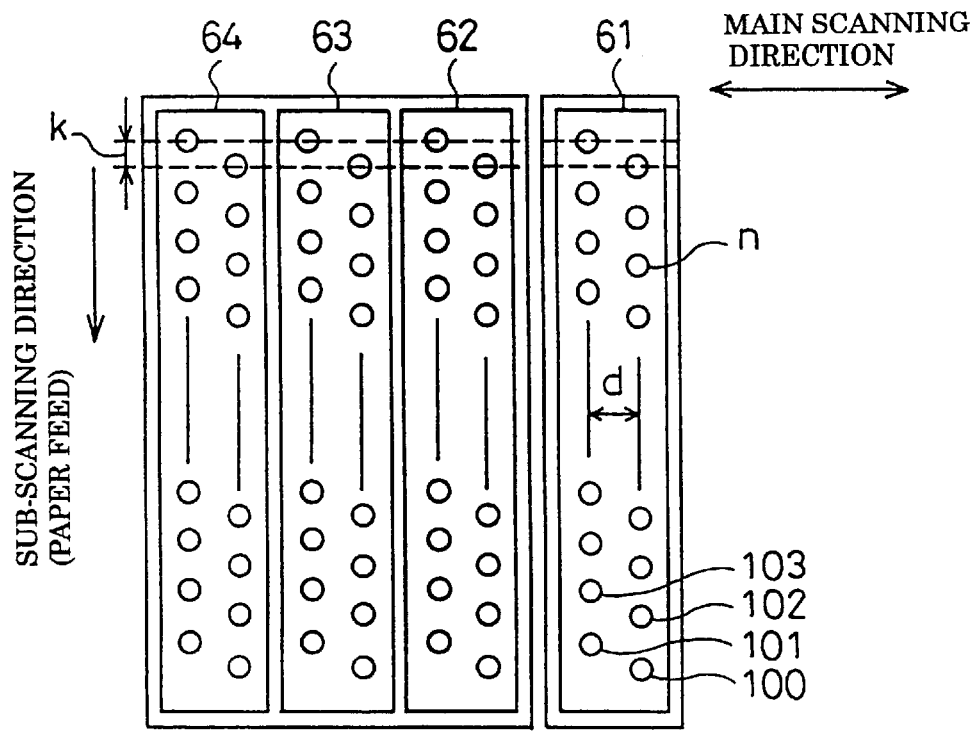
Fig. 5(B) DOTS FORMED BY ONE NOZZLE ARRAY

Fig. 7(A) CONCEPT OF SUB-SCAN FEED (s=1)
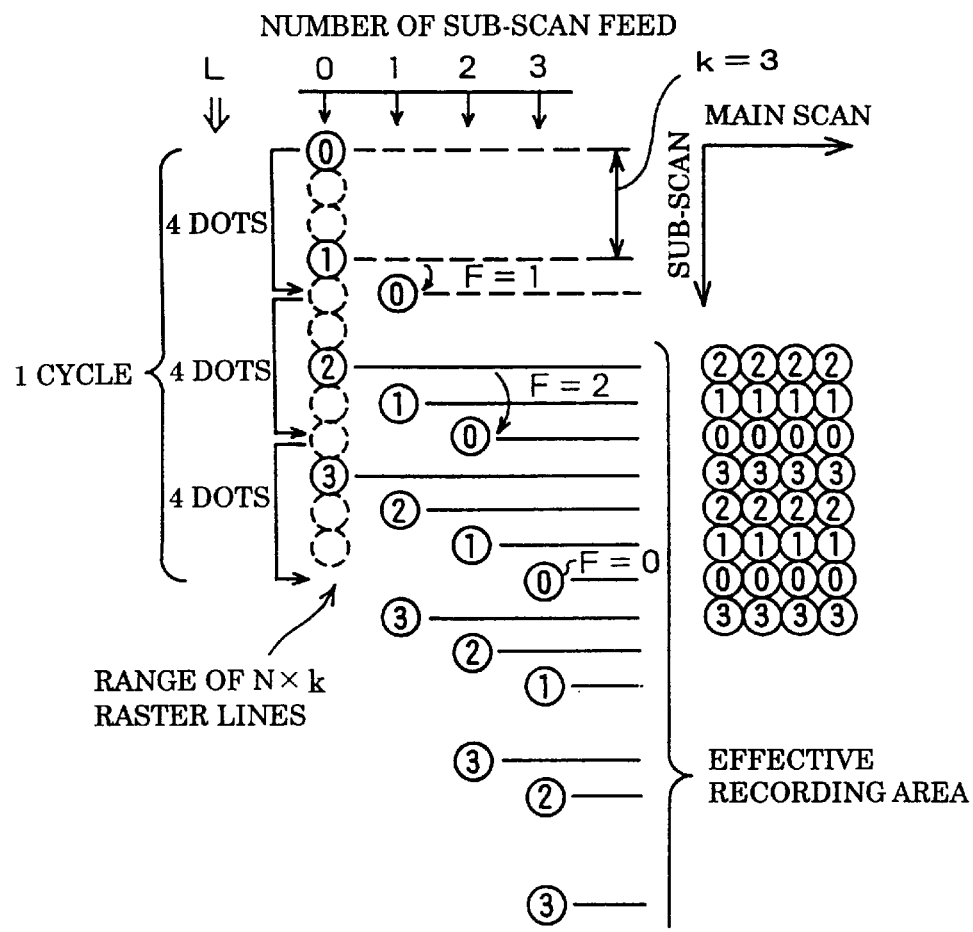
Fig. 7(B) PARAMETERS
NOZZLE PITCH k : 3 [dot]
NUMBER OF USED NOZZLES N : 4
NUMBER OF SCAN REPEATS s : 1
NUMBER OF EFFECTIVE NOZZLES Neff : 4
| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F = (ΣL) % k | 0 | 1 | 2 | 0 |

Fig. 8(A) CONCEPT OF SUB-SCAN FEED (s=2)
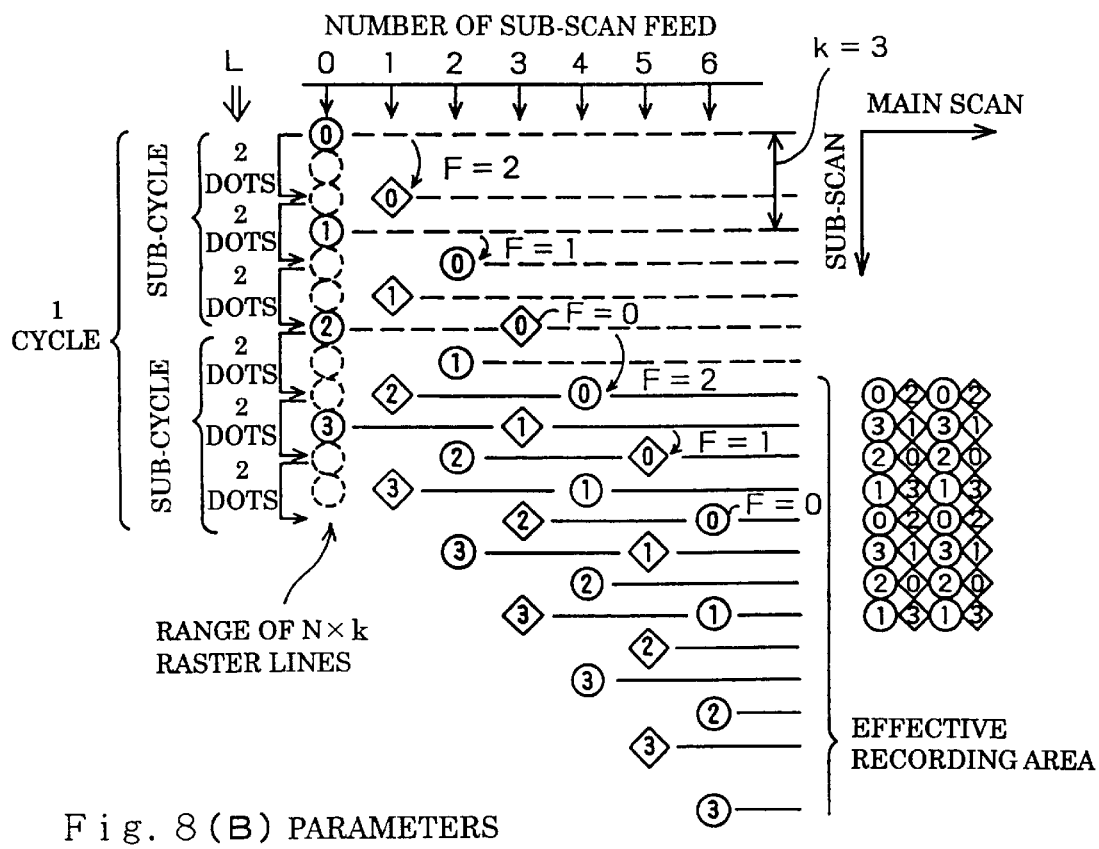
Fig. 8(B) PARAMETERS
NOZZLE PITCH k : 3 [dot]
NUMBER OF USED NOZZLES N : 4
NUMBER OF SCAN REPEATS s : 2
NUMBER OF EFFECTIVE NOZZLES Neff : 2
| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| ΣL | 0 | 2 | 4 | 6 | 8 | 10 | 12 |
| F = (ΣL) %k | 0 | 2 | 1 | 0 | 2 | 1 | 0 |

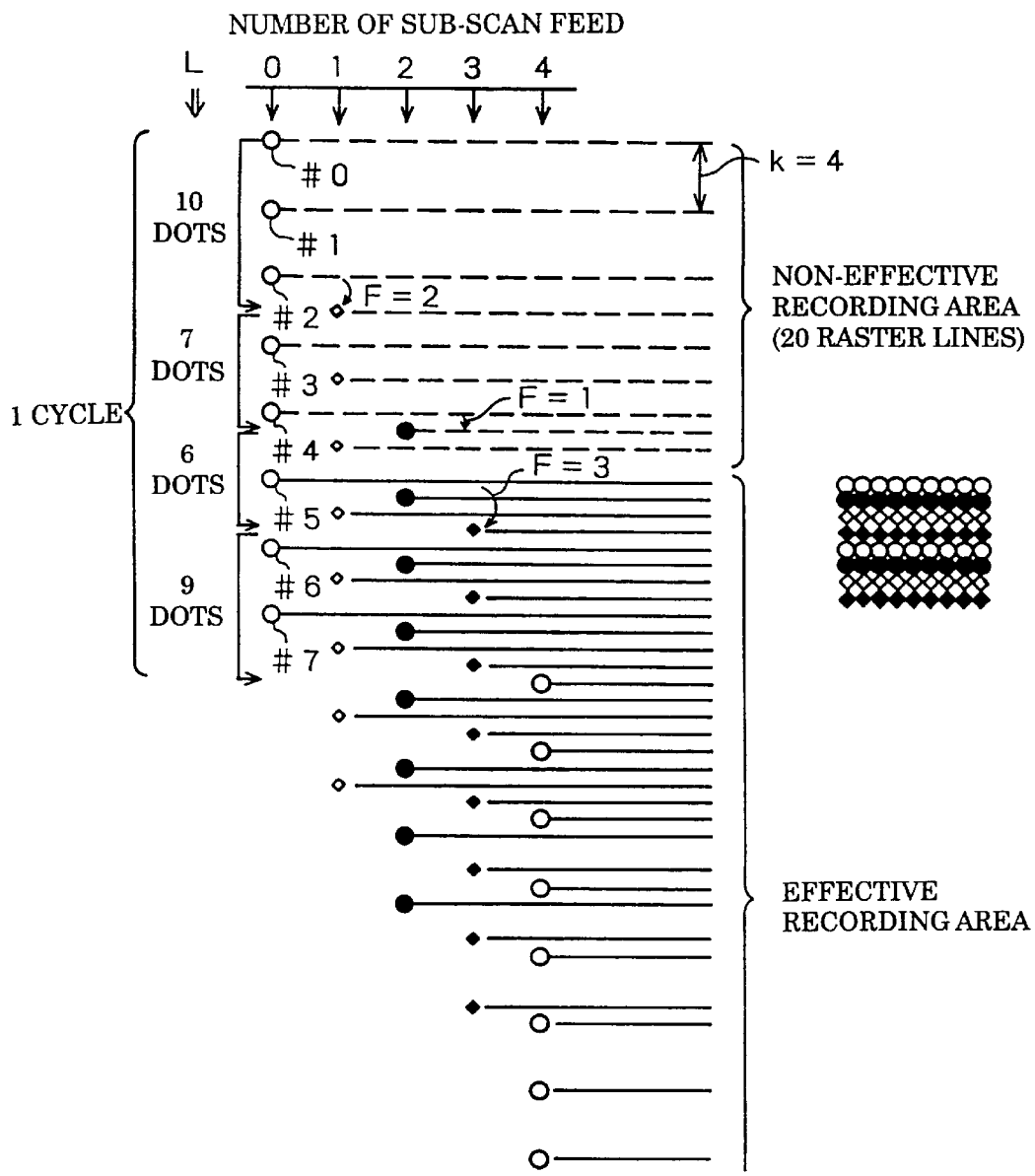
Fig. 9 FIRST DOT RECORDING SCHEME FOR k=4
SCAN PARAMETERS
NOZZLE PITCH k : 4 [dot]
NUMBER OF NOZZLES N : 8
NUMBER OF SCAN REPEATS s : 1
NUMBER OF EFFECTIVE NOZZLES Neff: 8

FIRST DOT RECORDING SCHEME FOR K=4

Fig. 10(A)  SCAN PARAMETERS

NOZZLE PITCH k : 4 [dot]
NUMBER OF USED NOZZLES N : 8
NUMBER OF SCAN REPEATS s : 1
NUMBER OF EFFECTIVE NOZZLES Neff : 8

| NUMBER OF SUB-SCAN FEED | 0 | 1 | 2 | 3 | 4 |
|---|---|---|---|---|---|
| FEED AMOUNT L [dot] | 0 | 10 | 7 | 6 | 9 |
| ΣL | 0 | 10 | 17 | 23 | 32 |
| F = (ΣL) % k | 0 | 2 | 1 | 3 | 0 |

Fig. 10(B)  RASTER NUMBERS OF EFFECTIVE RASTER LINES RECORDED BY RESPECTIVE NOZZLES

```
          NUMBER OF SUB-SCAN FEED
NOZZLE   0   1   2   3   4   5   6   7
 #0:     .   .   .   4  13  23  30 (36)
 #1:     .   .   2   8  17  27 (34)(40)
 #2:     .   .   6  12  21  31 (38)(44)
 #3:     .   3  10  16  25 (35)(42)(48)
 #4:     .   7  14  20  29 (39)(46)(52)
 #5:     1  11  18  24 (33)(43)(50)(56)
 #6:     5  15  22  28 (37)(47)(54)(60)
 #7:     9  19  26  32 (41)(51)(58)(64)
```

Fig. 11

NOZZLE NUMBERS FOR RECORDING RESPECTIVE RASTER LINES
(FIRST DOT RECORDING SCHEME FOR K=4)

| RASTER | @ | Δ | 0 | 1 | 2 | 3 | 4 | 5 | 6 |
|---|---|---|---|---|---|---|---|---|---|
| 1 | • | – | #5 | | | | | | |
| 2 | X | 2 | | | #1 | | | | |
| 3 | • | – | | #3 | | | | | |
| 4 | X | 3 | | | | #0 | | | |
| 5 | • | – | #6 | | | | | | |
| 6 | X | 2 | | | #2 | | | | |
| 7 | • | – | | #4 | | | | | |
| 8 | X | 3 | | | | #1 | | | |
| 9 | • | – | #7 | | | | | | |
| 10 | X | 2 | | | #3 | | | | |
| 11 | • | – | | #5 | | | | | |
| 12 | ↑ | 2 | | | | #2 | | | |
| 13 | X | 2 | | | | | #0 | | |
| 14 | ↓ | 1 | | | #4 | | | | |
| 15 | • | – | | #6 | | | | | |
| 16 | ↑ | 2 | | | | #3 | | | |
| 17 | X | 2 | | | | | #1 | | |
| 18 | ↓ | 1 | | | #5 | | | | |
| 19 | • | – | | #7 | | | | | |
| 20 | ↑ | 2 | | | | #4 | | | |
| 21 | X | 2 | | | | | #2 | | |
| 22 | • | – | | | #6 | | | | |
| 23 | X | 3 | | | | | | #0 | |
| 24 | • | – | | | | #5 | | | |
| 25 | X | 2 | | | | | #3 | | |
| 26 | • | – | | | #7 | | | | |
| 27 | X | 3 | | | | | | #1 | |
| 28 | • | – | | | | #6 | | | |
| 29 | ↑ | 1 | | | | | #4 | | |
| 30 | X | 2 | | | | | | | #0 |
| 31 | ↓ | | | | | | | #2 | |

SECOND DOT RECORDING SCHEME FOR k=4

Fig. 12(A)  SCAN PARAMETERS

NOZZLE PITCH k : 4 [dot]
NUMBER OF NOZZLES N : 8
NUMBER OF SCAN REPEATS s : 1
NUMBER OF EFFECTIVE NOZZLES Neff : 8

| NUMBER OF SUB-SCAN FEED | 0 | 1 | 2 | 3 | 4 |
|---|---|---|---|---|---|
| FEED AMOUNT L [dot] | 0 | 7 | 6 | 9 | 10 |
| $\Sigma L$ | 0 | 7 | 13 | 22 | 32 |
| $F = (\Sigma L) \% k$ | 0 | 3 | 1 | 2 | 0 |

Fig. 12(B)  RASTER NUMBERS OF EFFECTIVE RASTER LINES RECORDED BY RESPECTIVE NOZZLES

```
          NUMBER OF SUB-SCAN FEED
NOZZLE  0   1   2   3   4   5   6   7
 #0:    .   .   .   4  14  21  27 (36)
 #1:    .   .   .   8  18  25  31 (40)
 #2:    .   .   3  12  22  29 (35)
 #3:    .   1   7  16  26 (33)
 #4:    .   5  11  20  30 (37)
 #5:    2   9  15  24 (34)
 #6:    6  13  19  28 (38)
 #7:   10  17  23  32 (42)
```

Fig. 13

NOZZLE NUMBERS FOR RECORDING RESPECTIVE RASTER LINES
(SECOND DOT RECORDING SCHEME FOR k=4)

| RASTER | @ | Δ | 0 | 1 | 2 | 3 | 4 | 5 | 6 |
|---|---|---|---|---|---|---|---|---|---|
| 1 | ↓ | 1 | . | #3 | | | | | |
| 2 | · | – | | #5 | | | | | |
| 3 | ↑ | 2 | . | . | #2 | | | | |
| 4 | X | 2 | . | . | . | #0 | | | |
| 5 | ↓ | 1 | . | #4 | | | | | |
| 6 | · | – | | #6 | | | | | |
| 7 | ↑ | 2 | . | . | #3 | | | | |
| 8 | X | 2 | . | . | . | #1 | | | |
| 9 | ↓ | 1 | . | #5 | | | | | |
| 10 | · | – | | #7 | | | | | |
| 11 | ↑ | 2 | . | . | #4 | | | | |
| 12 | X | 2 | . | . | . | #2 | | | |
| 13 | · | – | . | #6 | | | | | |
| 14 | X | 3 | . | . | . | . | #0 | | |
| 15 | · | – | . | . | #5 | | | | |
| 16 | X | 2 | . | . | . | #3 | | | |
| 17 | · | – | . | #7 | | | | | |
| 18 | X | 3 | . | . | . | . | #1 | | |
| 19 | · | – | . | . | #6 | | | | |
| 20 | ↑ | 1 | . | . | . | #4 | | | |
| 21 | X | 2 | . | . | . | . | . | #0 | |
| 22 | ↓ | 2 | . | . | . | . | #2 | | |
| 23 | · | – | . | . | #7 | | | | |
| 24 | ↑ | 1 | . | . | . | #5 | | | |
| 25 | X | 2 | . | . | . | . | . | #1 | |
| 26 | · | – | . | . | . | . | #3 | | |
| 27 | X | 3 | . | . | . | . | . | . | #0 |
| 28 | · | – | . | . | . | #6 | | | |
| 29 | X | 2 | . | . | . | . | . | #2 | |
| 30 | · | – | . | . | . | . | #4 | | |
| 31 | X | 3 | . | . | . | . | . | . | #1 |
| 32 | · | | . | . | . | #7 | | | |

THIRD DOT RECORDING SCHEME FOR k=4

Fig. 14(A)  SCAN PARAMETERS

NOZZLE PITCH k : 4 [dot]
NUMBER OF NOZZLES N : 7
NUMBER OF SCAN REPEATS s : 1
NUMBER OF EFFECTIVE NOZZLES Neff : 7

| NUMBER OF SUB-SCAN FEED | 0 | 1 | 2 | 3 | 4 |
|---|---|---|---|---|---|
| FEED AMOUNT L [dot] | 0 | 7 | 7 | 7 | 7 |
| ΣL | 0 | 7 | 14 | 21 | 28 |
| F = (ΣL) % k | 0 | 3 | 2 | 1 | 0 |

Fig. 14(B) RASTER NUMBERS OF EFFECTIVE RASTER LINES RECORDED BY RESPECTIVE NOZZLES

```
            NUMBER OF SUB-SCAN FEED
NOZZLE  0   1   2   3   4   5   6   7
  #0:   .   .   .   4  11  18  25 (32)
  #1:   .   .   1   8  15  22 (29)
  #2:   .   .   5  12  19  26 (33)
  #3:   .   2   9  16  23 (30)
  #4:   .   6  13  20  27 (34)
  #5:   3  10  17  24 (31)
  #6:   7  14  21  28 (35)
```

Fig. 15

NOZZLE NUMBERS FOR RECORDING RESPECTIVE RASTER LINES
(THIRD DOT RECORDING SCHEME FOR k=4)

| RASTER | @ | Δ | \multicolumn{8}{c}{NUMBER OF SUB-SCAN FEED} |
|---|---|---|---|---|---|---|---|---|---|---|
|  |  |  | 0 | 1 | 2 | 3 | 4 | 5 | 6 | 7 |
| 1 | ↓ | 1 | . | . | #1 |  |  |  |  |  |
| 2 | ↓ | 1 | . | #3 |  |  |  |  |  |  |
| 3 | • | − | #5 |  |  |  |  |  |  |  |
| 4 | X | 3 | . | . | . | #0 |  |  |  |  |
| 5 | ↓ | 1 | . | . | #2 |  |  |  |  |  |
| 6 | ↓ | 1 | . | #4 |  |  |  |  |  |  |
| 7 | • | − | #6 |  |  |  |  |  |  |  |
| 8 | X | 3 | . | . | . | #1 |  |  |  |  |
| 9 | ↓ | 1 | . | . | #3 |  |  |  |  |  |
| 10 | • | − | . | #5 |  |  |  |  |  |  |
| 11 | X | 3 | . | . | . | . | #0 |  |  |  |
| 12 | ↓ | 1 | . | . | . | #2 |  |  |  |  |
| 13 | ↓ | 1 | . | . | #4 |  |  |  |  |  |
| 14 | • | − | . | #6 |  |  |  |  |  |  |
| 15 | X | 3 | . | . | . | . | #1 |  |  |  |
| 16 | ↓ | 1 | . | . | . | #3 |  |  |  |  |
| 17 | • | − | . | . | #5 |  |  |  |  |  |
| 18 | X | 3 | . | . | . | . | . | #0 |  |  |
| 19 | ↓ | 1 | . | . | . | . | #2 |  |  |  |
| 20 | ↓ | 1 | . | . | . | #4 |  |  |  |  |
| 21 | • | − | . | . | #6 |  |  |  |  |  |
| 22 | X | 3 | . | . | . | . | . | #1 |  |  |
| 23 | ↓ | 1 | . | . | . | . | #3 |  |  |  |
| 24 | • | − | . | . | . | #5 |  |  |  |  |
| 25 | X | 3 | . | . | . | . | . | . | #0 |  |
| 26 | ↓ | 1 | . | . | . | . | . | #2 |  |  |
| 27 | ↓ | 1 | . | . . | . | . | #4 |  |  |  |
| 28 | • | − | . | . | . | #6 |  |  |  |  |
| 29 | X | 3 | . | . | . | . | . | . | #1 |  |
| 30 | ↓ | 1 | . | . | . | . | . | #3 |  |  |
| 31 | • | − | . | . | . | . | #5 |  |  |  |
| 32 | X | 3 | . | . | . | . | . | . | . | #0 |

Fig. 16(A)
SCAN PARAMETERS IN FOURTH DOT RECORDING SCHEME FOR k=4

NOZZLE PITCH k                   : 4 [dot]
NUMBER OF NOZZLES N              : 16
NUMBER OF SCAN REPEATS s         : 2
NUMBER OF EFFECTIVE NOZZLES Neff : 8

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 10 | 7 | 6 | 9 | 10 | 7 | 6 | 9 |
| $\Sigma L$ | 0 | 10 | 17 | 23 | 32 | 42 | 49 | 55 | 64 |
| $F = (\Sigma L) \% k$ | 0 | 2 | 1 | 3 | 0 | 2 | 1 | 3 | 0 |

Fig. 16(B)
SCAN PARAMETERS IN FIFTH DOT RECORDING SCHEME FOR k=4

NOZZLE PITCH k                   : 4 [dot]
NUMBER OF NOZZLES N              : 16
NUMBER OF SCAN REPEATS s         : 2
NUMBER OF EFFECTIVE NOZZLES Neff : 8

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 7 | 6 | 9 | 10 | 7 | 6 | 9 | 10 |
| $\Sigma L$ | 0 | 7 | 13 | 22 | 32 | 39 | 45 | 54 | 64 |
| $F = (\Sigma L) \% k$ | 0 | 3 | 1 | 2 | 0 | 3 | 1 | 2 | 0 |

Fig. 16(C)
SCAN PARAMETERS IN SIXTH DOT RECORDING SCHEME FOR k=4

NOZZLE PITCH k                   : 4 [dot]
NUMBER OF NOZZLES N              : 14
NUMBER OF SCAN REPEATS s         : 2
NUMBER OF EFFECTIVE NOZZLES Neff : 7

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 7 | 7 | 7 | 7 | 7 | 7 | 7 | 7 |
| $\Sigma L$ | 0 | 7 | 14 | 21 | 28 | 35 | 42 | 49 | 56 |
| $F = (\Sigma L) \% k$ | 0 | 3 | 2 | 1 | 0 | 3 | 2 | 1 | 0 |

Fig. 17(A)
SCAN PARAMETERS IN FIRST DOT RECORDING SCHEME FOR k=6
NOZZLE PITCH k : 6 [dot], NUMBER OF SCAN REPEATS s : 2
NUMBER OF NOZZLES N : 48 , NUMBER OF EFFECTIVE NOZZLES Neff : 24

| NUMBER OF SUB-SCAN FEED | 0 | 1 | 2 | 3 | 4 | 5 | 6 |
|---|---|---|---|---|---|---|---|
| FEED AMOUNT L [dot] | 0 | 20 | 27 | 22 | 28 | 21 | 26 |
| $\Sigma L$ | 0 | 20 | 47 | 69 | 97 | 118 | 144 |
| $F = (\Sigma L) \% k$ | 0 | 2 | 5 | 3 | 1 | 4 | 0 |

Fig. 17(B)
SCAN PARAMETERS IN SECOND DOT RECORDING SCHEME FOR k=6
NOZZLE PITCH k : 6 [dot], NUMBER OF SCAN REPEATS s : 2
NUMBER OF NOZZLES N : 48 , NUMBER OF EFFECTIVE NOZZLES Neff : 24

| NUMBER OF SUB-SCAN FEED | 0 | 1 | 2 | 3 | 4 | 5 | 6 |
|---|---|---|---|---|---|---|---|
| FEED AMOUNT L [dot] | 0 | 27 | 26 | 20 | 21 | 22 | 28 |
| $\Sigma L$ | 0 | 27 | 53 | 73 | 94 | 116 | 144 |
| $F = (\Sigma L) \% k$ | 0 | 3 | 5 | 1 | 4 | 2 | 0 |

Fig. 17(C)
SCAN PARAMETERS IN THIRD DOT RECORDING SCHEME FOR k=6
NOZZLE PITCH k : 6 [dot], NUMBER OF SCAN REPEATS s : 2
NUMBER OF NOZZLES N : 47 , NUMBER OF EFFECTIVE NOZZLES Neff : 23.5

| NUMBER OF SUB-SCAN FEED | 0 | 1 | 2 | 3 | 4 | 5 | 6 |
|---|---|---|---|---|---|---|---|
| FEED AMOUNT L [dot] | 0 | 21 | 26 | 21 | 26 | 21 | 26 |
| $\Sigma L$ | 0 | 21 | 47 | 68 | 94 | 115 | 141 |
| $F = (\Sigma L) \% k$ | 0 | 3 | 5 | 2 | 4 | 1 | 3 |
| NUMBER OF SUB-SCAN FEED | | 7 | 8 | 9 | 10 | 11 | 12 |
| FEED AMOUNT L [dot] | | 21 | 26 | 21 | 26 | 21 | 26 |
| $\Sigma L$ | | 162 | 188 | 209 | 235 | 256 | 282 |
| $F = (\Sigma L) \% k$ | | 0 | 2 | 5 | 1 | 4 | 0 |

Fig. 17(D)
SCAN PARAMETERS IN FOURTH DOT RECORDING SCHEME FOR k=6
NOZZLE PITCH k : 6 [dot], NUMBER OF SCAN REPEATS s : 2
NUMBER OF NOZZLES N : 47 , NUMBER OF EFFECTIVE NOZZLES Neff : 23.5

| NUMBER OF SUB-SCAN FEED | 0 | 1 | 2 | 3 | 4 | 5 | 6 |
|---|---|---|---|---|---|---|---|
| FEED AMOUNT L [dot] | 0 | 15 | 32 | 15 | 32 | 15 | 32 |
| $\Sigma L$ | 0 | 15 | 47 | 62 | 94 | 109 | 141 |
| $F = (\Sigma L) \% k$ | 0 | 3 | 5 | 2 | 4 | 1 | 3 |
| NUMBER OF SUB-SCAN FEED | | 7 | 8 | 9 | 10 | 11 | 12 |
| FEED AMOUNT L [dot] | | 15 | 32 | 15 | 32 | 15 | 32 |
| $\Sigma L$ | | 156 | 188 | 203 | 235 | 250 | 282 |
| $F = (\Sigma L) \% k$ | | 0 | 2 | 5 | 1 | 4 | 0 |

SEVENTH DOT RECORDING SCHEME FOR k=4

EIGHTH DOT RECORDING SCHEME FOR k=4

DISTRIBUTION OF INTER-RULED LINE DISTANCE Dras

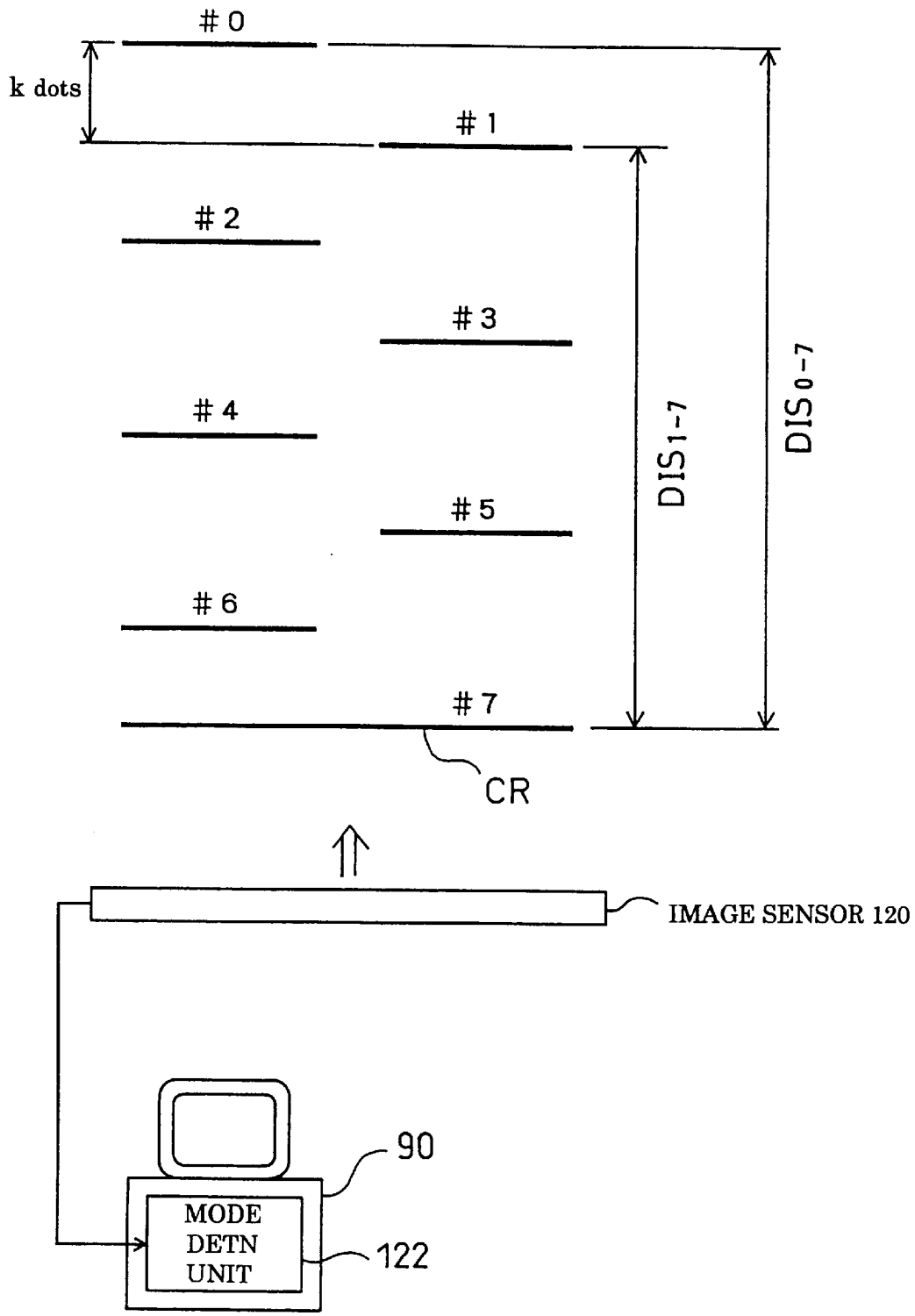
Fig. 24 ANOTHER EXAMPLE OF RECORDING AND READING OF LATERAL RULED LINES Fig. 25(A) READING GRAY IMAGE
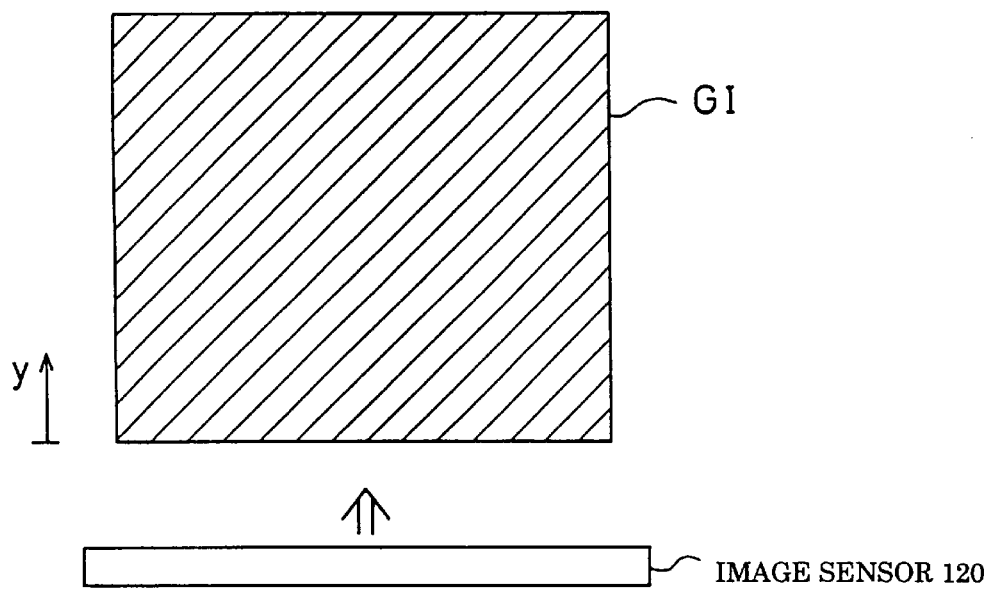
Fig. 25(B) DENSITY DISTRIBUTION
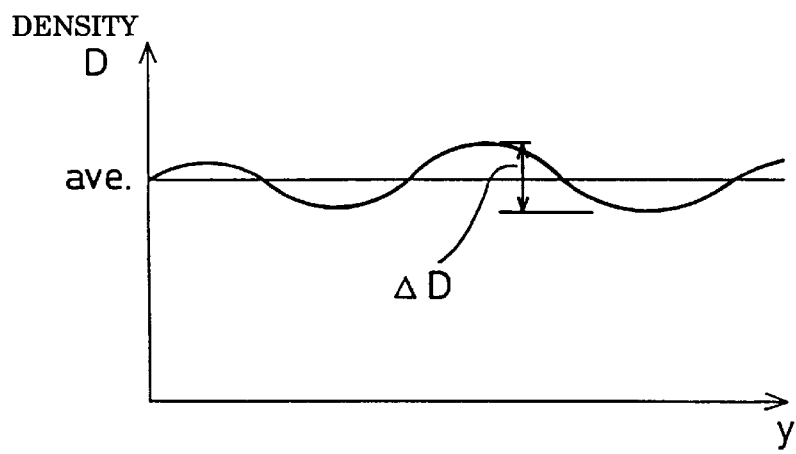

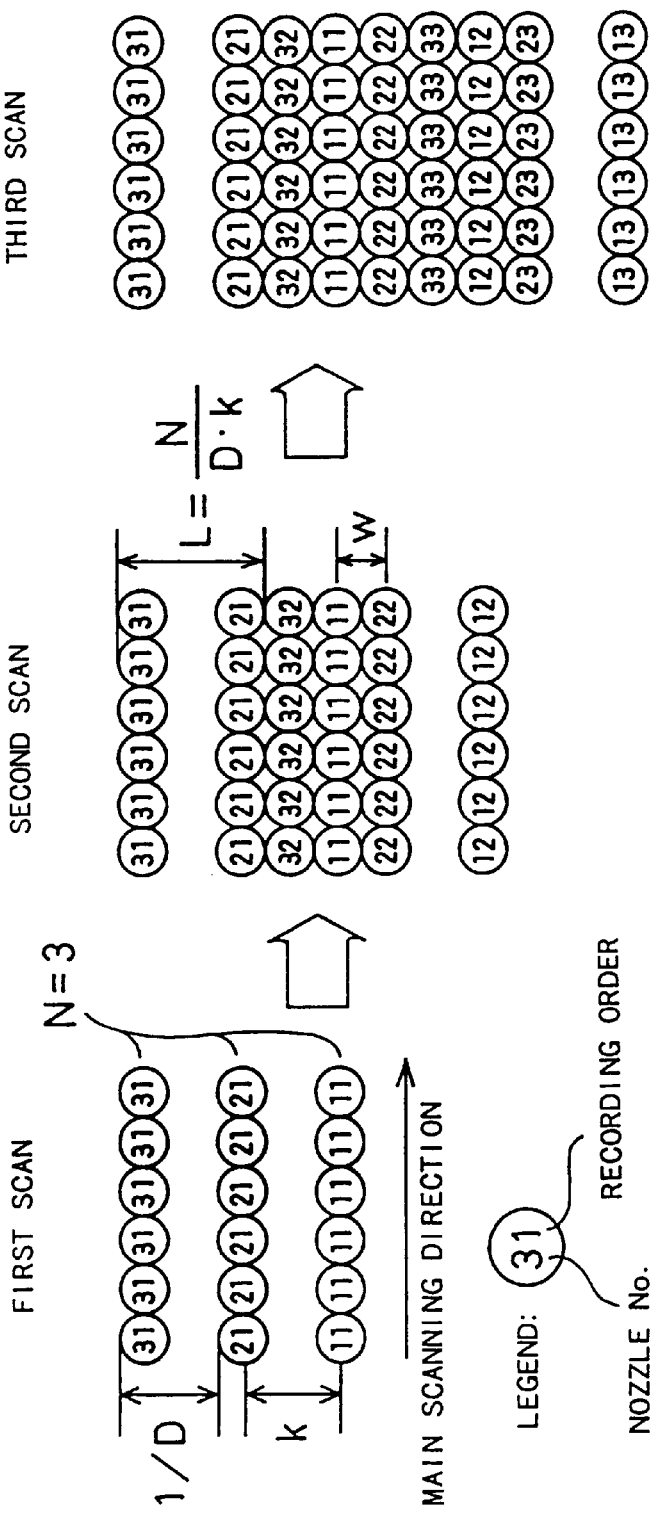

DOT RECORDING METHOD AND DOT RECORDING APPARATUS

This application is a continuation of application Ser. No. 09/194,435, filed on Dec. 2, 1998, which is a 371 of PCT/JP98/01605, filed on Apr. 7, 1998.

INDUSTRIAL FIELD

The present invention relates to a technique of recording dots on the surface of a printing medium with a dot recording head.

BACKGROUND ART

Serial scan-type printers and drum scan-type printers are dot recording devices which record dots with a recording head while carrying out scans both in a main scanning direction and a sub-scanning direction. There is a technique called the "interlace scheme", which is taught by U.S. Pat. No. 4,198,642 and Japanese Patent Laid-Open Gazette No. 53-2040, for improving the image quality of printers of this type, especially ink jet printers.

FIG. 26 is a diagram for explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning pitch [dots] or [inch];
w: Dot pitch [inch].

The number of nozzles N is the number of nozzles actually used to form dots. In the example of FIG. 26, N=3. The nozzle pitch k is the interval between the centers of the recording head nozzles expressed in units of the recorded image pitch (dot pitch w). In the example of FIG. 26, k=2. The number of scan repeats s is the number of main scans in which all dot positions on a main scanning line are serviced. In the example of FIG. 26, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the recording head. The sub-scanning pitch L (inch) is the distance moved in 1 sub-scan. The dot pitch w (inch) is the pitch of the dots in the recorded image. In general, it holds that w=1/(D·k), k=1/(D·w).

The circles containing two-digit numerals in FIG. 26 indicate dot recording positions. As indicated in the legend, the numeral on the left in each circle indicates the nozzle number and the numeral on the right indicates the recording order (the number of the main scan in which it was recorded).

The interlace scheme shown in FIG. 26 is characterized by the configuration of the nozzle array of the recording head and the sub-scanning method. Specifically, in the interlace scheme, the nozzle pitch k indicating the interval between the centers of adjacent nozzles is defined as an integer not smaller than 2, while the number of nozzles N and the nozzle pitch k are selected as integers which are relatively prime. Further, sub-scanning pitch L is set at a constant value given by N/(D·k).

The interlace scheme makes irregularities in nozzle pitch and ink jetting Feature to thin out over the recorded image. Because of this, it improves image quality by mitigating the effect of any irregularity that may be present in the nozzle pitch, the jetting Feature and the like.

The "overlap scheme", also known as the "multi-scan scheme", taught for example by Japanese Patent Laid-Open Gazette No. 3-207665 and Japanese Patent Publication Gazette No. 4-19030 is another technique used to improve image quality in color ink jet printers.

FIG. 27 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 27, a dot is formed at every second dot position. The timing of the driving of the nozzle sets is controlled so that the each nozzle set forms dots at different positions from the other in the main scanning direction. In other words, as shown in FIG. 27, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pick k is set at an integer no less than 2, as in the interlace scheme. However, the number of nozzles N and the nozzle pitch k are not relatively prime, but the nozzle pitch k and the value N/s, which is obtained by dividing the number of nozzles N by the number of scan repeats s, are set at relatively prime integers instead.

In the overlap scheme, the dots of each main scanning line are not all recorded by the same nozzle but by multiple nozzles. Even when the nozzle characteristics (pitch, jetting characteristic etc.) are not completely uniform, therefore, enhanced image quality can be obtained because the characteristics of the individual nozzles is prevented from affecting the entire main scanning line.

As described above, a variety of dot recording schemes have so far been proposed. In the actual state, the image quality also depends upon the manufacturing error of the dot recording apparatus. A desired dot recording scheme may thus be different for individual dot recording apparatuses that have been manufactured according to an identical design. In the prior art technique, it is difficult to adopt a desired dot recording scheme suitable for each individual dot recording apparatus.

The present invention is made to solve the problem of the prior art, and an object of the present invention is to provide a technique that enables a desired dot recording scheme to be adopted for each individual dot recording apparatus.

DISCLOSURE OF THE INVENTION

In order to solve at least part of the above problems, there is provided a dot recording apparatus for recording dots on a surface of a printing medium with a dot recording head. The dot recording apparatus comprises: a dot-forming element array arranged on the dot recording head to face the printing medium, the dot-forming element array comprising a plurality of dot-forming elements for forming a plurality of dots of an identical color at a substantially constant pitch in a sub-scanning direction; a main scan driving unit that drives at least one of the dot recording head and the printing medium to carry out main scan; a head driving unit that drives at least part of the plurality of dot-forming elements to form dots in the course of the main scan; a sub-scan driving unit that drives at least one of the dot recording head and the printing medium every time when the main scan is completed, thereby carrying out sub-scan; and a control unit that controls the above units.

The control unit comprises: a recording mode storage unit that stores a plurality of dot recording modes having a substantially equal recording speed, as alternative dot recording modes each defining operations of the main scan and the sub-scan for recording dots at an identical recording resolution; a mode selection information setting unit, in which mode selection information is set to specify a desired dot recording mode among the plurality of dot recording modes; and a unit that executes the dot recording according to the desired dot recording mode specified by the mode selection information.

The above dot recording apparatus enables a desired dot recording mode for attaining high image quality to be selected among a plurality of dot recording modes stored in the recording mode storage unit and set in the mode selection information setting unit in each individual dot recording apparatus. This enables adoption of a desired dot recording scheme suitable for each individual dot recording apparatus accordingly.

The plurality of dot recording modes may be different from each other in at least one of two scanning conditions of: a sequence of sub-scan feed amounts and dot-forming elements used for each main scan.

In this arrangement, the plurality of dot recording modes are different from each other in combinations of the dot-forming elements used for recording the adjoining main scanning lines. In the case where mismatching of distances between the recorded main scanning lines causes deterioration of the image quality, this arrangement enables selection of the dot recording mode to minimize the deterioration of the image quality.

The mode selection information is preferably set in a rewritable nonvolatile memory. In this arrangement, the mode selection information can be stored in each individual dot recording apparatus and can be rewritten if required.

Preferably, the plurality of dot recording modes include a first type of dot recording mode, in which a number of effective dot-forming elements and an element pitch are set at integers of at least two that are not relatively prime, and in which a plurality of different values are used in combination for sub-scan feed amounts for a plurality of sub-scans, the number of effective dot-forming elements representing a net number of raster lines in a main scanning direction to be recorded in one main scan, the element pitch representing a pitch of the plurality of dot-forming elements expressed in unit of a number of dots. Use of the first type of dot recording mode ascertains a large number of equivalent dot recording modes that have an identical resolution and an identical recording speed but adopt different combinations of sub-scan feed amounts. Selection of the desired mode suitable for each individual dot recording apparatus among the large number of equivalent dot recording modes enables an image of higher image quality to be recorded.

Preferably, the plurality of dot recording modes further include a second type of dot recording mode in which the number of effective dot-forming elements and the element pitch are set at integers that are relatively prime. This arrangement enables a variety of different values to be set to the number of the dot-forming elements. This accordingly improves the flexibility in selection of a desired mode from the viewpoint of image quality and recording speed for each individual dot recording apparatus.

The plurality of dot recording modes may include a dot recording mode in which dot-forming elements used in each main scan are selected for each main scan. This arrangement increases the degree of freedom in selecting a dot recording mode and thereby enables selection of the dot recording mode for attaining higher image quality.

The plurality of dot recording modes may include a plurality of dot recording modes that have a substantially equal number of effective dot-forming elements representing a net number of raster lines in a main scanning direction recorded by one main scan; and one of the plurality of dot recording modes having the identical recording resolution and the substantially equal number of effective dot-forming elements may be specified by the mode selection information. This arrangement also increases the degree of freedom in setting the dot recording mode and thereby enables selection of the dot recording mode for attaining higher image quality.

A plurality of recorded test images, which are obtained by recording a specific test image in the plurality of dot recording modes, may be captured by a sensor, respectively; and outputs of the sensor may be analyzed to thereby select the desired dot recording mode among the plurality of dot recording modes. This arrangement enables selection of a dot recording mode for attaining high image quality by analyzing the identical test images.

The test image may include a plurality of straight lines that are recorded by different dot-forming elements and extend in a main scanning direction. In this case, the selection of the desired dot recording mode may be carried out by determining an evaluation value which represents a scatter of intervals of the plurality of straight lines for each of the plurality of dot recording modes, and selecting the desired dot recording mode based on the evaluation value. Since the evaluation value represents a scatter of distances between raster lines, a dot recording mode for attaining high image quality can be determined readily by utilizing this evaluation value.

The present invention is also directed to a method of recording dots on a surface of a printing medium with a dot recording head while carrying out a main scan in a direction substantially perpendicular to a sub-scanning direction, the dot recording head having a dot-forming element array including a plurality of dot-forming elements for forming a plurality of dots of an identical color arranged at a substantially constant pitch in the sub-scanning direction. The method comprises the steps of: (a) recording a specific test image in a plurality of dot recording modes that have a substantially equal recording speed, the plurality of dot recording modes defining operations of the main scan and the sub-scan for recording dots at an identical recording resolution; (b) selecting among the plurality of dot recording modes a desired dot recording mode corresponding to a desired recorded test image which has been selected out of a plurality of recorded test images recorded in the plurality of dot recording modes; (c) setting mode selection information for specifying the desired dot recording mode; and (d) recording dots according to the desired dot recording mode specified by the mode selection information.

This method also enables adoption of a desired dot recording scheme suitable for each individual dot recording apparatus to record high quality images.

The present invention is further directed to a computer program product storing a computer program for causing a printing apparatus to record dots on a surface of a printing medium while carrying out a main scan in a direction substantially perpendicular to a sub-scanning direction, the printing apparatus comprising a dot recording head having a dot-forming element array including a plurality of dot-forming elements for forming a plurality of dots of an identical color arranged at a substantially constant pitch in the sub-scanning direction. The computer program product comprises: a computer readable medium; and a computer program stored on the computer readable medium. The computer program comprises: a first program code that causes a computer to read a desired dot recording mode from a first storage unit for storing a plurality of dot recording modes according to mode selection information which has been set in advance for specifying the desired dot recording mode among the plurality of dot recording modes; and a second program code that causes the computer to execute dot recording according to the desired dot recording mode specified by the mode selection information.

When the computer program is executed by a computer, a desired dot recording scheme suitable for each individual dot recording apparatus can be adopted to record high quality images.

Various medium can be used as the computer readable medium such as: flexible disks, CD-ROMs, magneto-optical disks, punch cards, printed matters on which codes such as bar codes are printed, internal storage devices (memories such as RAMs and ROMs), and external storage devices.

BRIEF DESCRIPTION OF THE DRAWINGS

FIGS. 5(A) and 5(B) show an arrangement of ink jet nozzles on ink jet heads 61 through 64;

FIGS. 7(A) and 7(B) show the fundamental conditions of a general dot recording scheme when the number of scan repeats s is equal to 1;

FIGS. 8(A) and 8(B) show the fundamental conditions of a general dot recording scheme when the number of scan repeats s is no less than 2;

FIG. 9 shows a first dot recording scheme for k=4;

FIGS. 10(A) and 10(B) show the scan parameters and the raster numbers of the effective raster lines recorded by the respective nozzles in the first dot recording scheme for k=4;

FIG. 11 shows the nozzle numbers for recording the effective raster lines in the first dot recording scheme for k=4;

FIGS. 12(A) and 12(B) show the scan parameters and the raster numbers of the effective raster lines recorded by the respective nozzles in a second dot recording scheme for k=4;

FIG. 13 shows the nozzle numbers for recording the effective raster lines in the second dot recording scheme for k=4;

FIGS. 14(A) and 14(B) show the scan parameters and the raster numbers of the effective raster lines recorded by the respective nozzles in a third dot recording scheme for k=4;

FIG. 15 shows the nozzle numbers for recording the effective raster lines in the third dot recording scheme for k=4;

FIGS. 16(A)–16(C) show the scan parameters in fourth through sixth dot recording schemes for k=4;

FIGS. 17(A)–17(D) show the scan parameters in the first through the fourth dot recording schemes for k=6;

FIG. 24 shows another example of ruled lines and the method of reading the ruled lines;

FIGS. 25(A) and 25(B) show another method of evaluating the image quality;

FIG. 26 shows a conventional interlace recording scheme; and

BEST MODES FOR CARRYING OUT THE INVENTION

A. Structure of Apparatus

Figure 1:
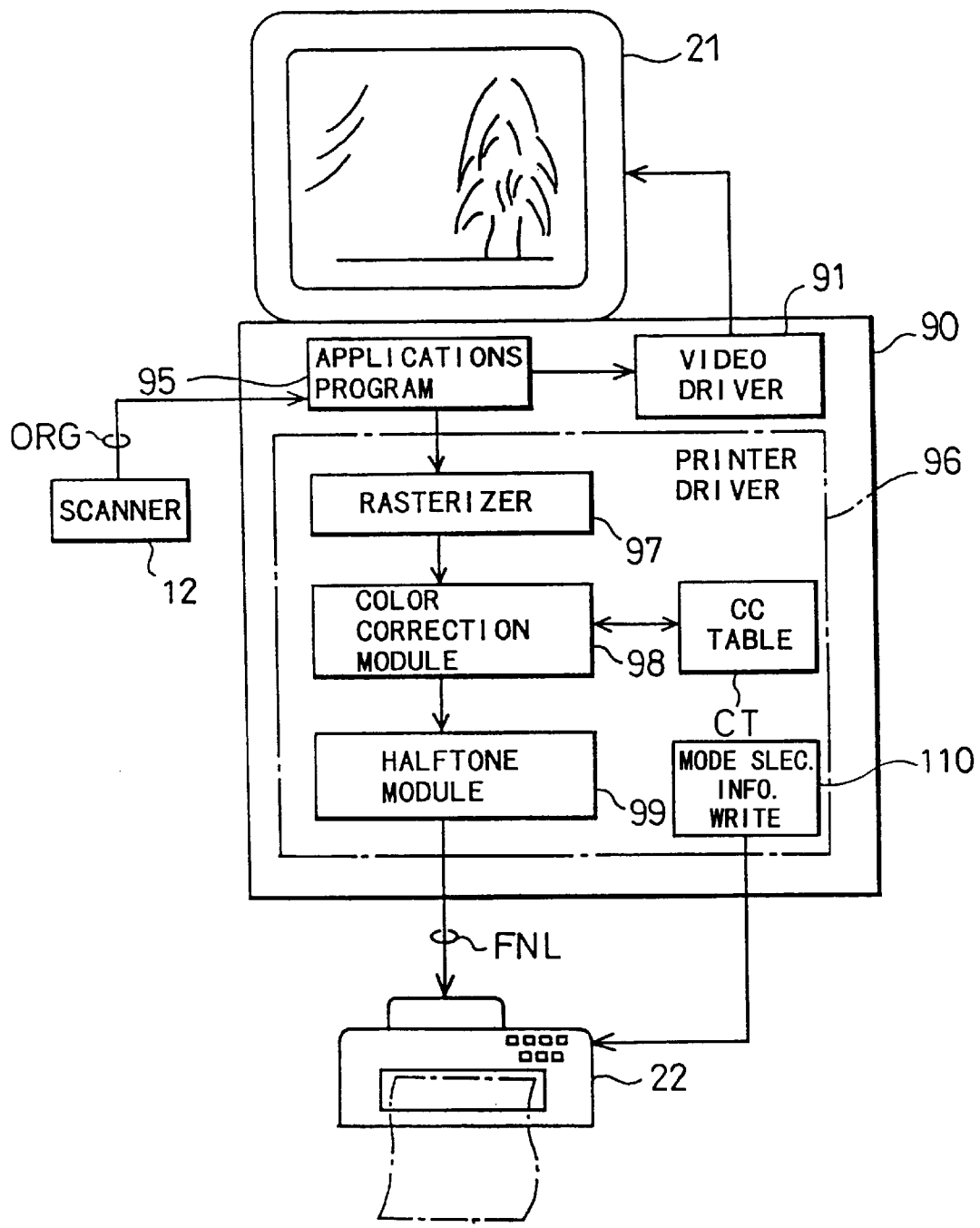
FIG. 1 is a block diagram schematically illustrating the structure of an image processing system embodying the present invention.

FIG. 1 is a block diagram illustrating the structure of a color image processing system embodying the present invention. The color image processing system includes a scanner 12, a personal computer 90, and a color printer 22. The personal computer 90 includes a color display 21. The scanner 21 captures color image data of a color original, and supplies the original color image data ORG, including R, G, and B components, to the computer 90.

The computer 90 is provided therein with CPU, RAM, and ROM (not shown), and an applications program 95 runs under a specific operating system. A video driver 91 and a printer driver 96 are incorporated in the operating system, and final color image data FNL of the applications program 95 are output through these drivers. The applications program 95 used for, for example, retouch an image, reads an image from the scanner, execute a prescribed processing, and displays the image on the CRT display 93 through the video driver 91. When the applications program 95 outputs a printing instruction, the printer driver 96 receives image information from the applications program 95 and converts the input image information to printing signals for the printer 22. (The printing signals are binarized signals for the respective colors of C, M, Y, and K.) In the example of FIG. 1, the printer driver 96 includes: a rasterizer 97 for converting the color image data processed by the applications program 95 to dot-based image data; a color correction module 98 for executing color correction on the dot-based image data according to the ink colors of C, M, and Y used by the printer 22 and the colorimetric characteristics of the printer 22; a color correction table CT referred to by the color correction module 98; a halftone module 99 for generating halftone image data, which represents image density in a particular area by on/off of ink in each dot, from the color-corrected image data; and a mode selection writing module 110 for writing mode selection information, which will be described later, into a memory in the color printer 22.

Figure 2:
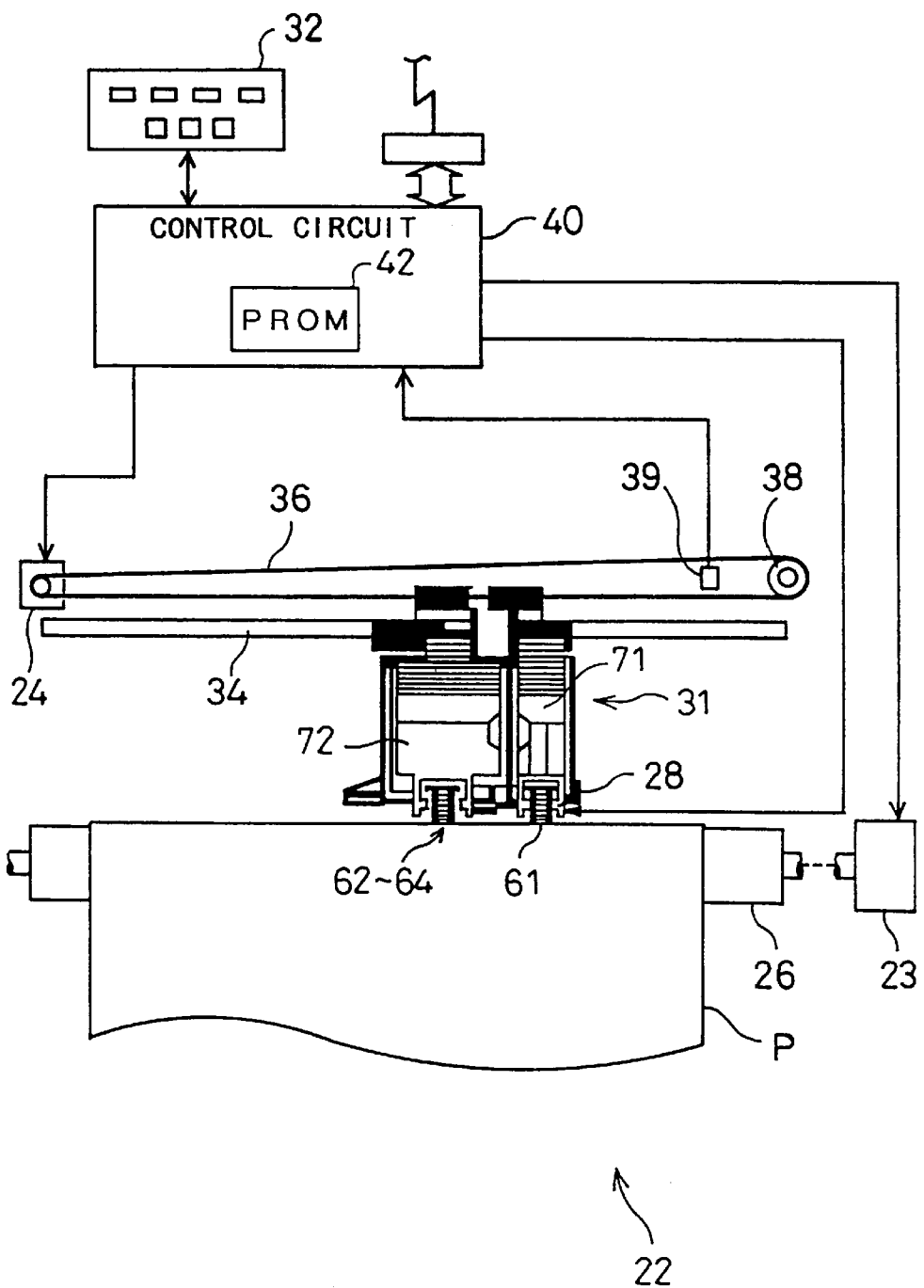
FIG. 2 schematically illustrates the structure of a color printer 22 as an example of the image output apparatus 20.

FIG. 2 schematically illustrates the structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61 through 64 are formed on the print head 28 that is disposed in the lower portion of the carriage 31, and ink supply conduits 65 (see FIG. 3) are formed in the bottom portion of the carriage 31 for leading supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 3:
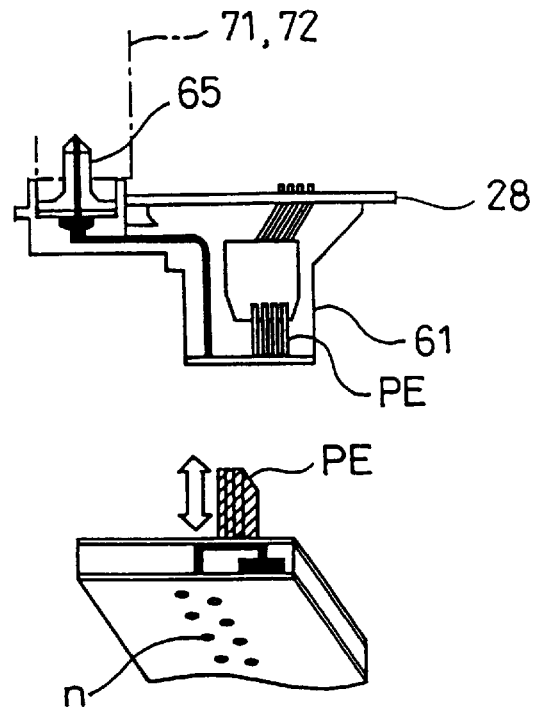
FIG. 3 illustrates the structure of a print head 28.

The following briefly describes the mechanism of discharging ink. When the ink cartridges 71 and 72 are attached to the carriage 31, inks in the ink cartridges 71 and 72 are sucked out through the ink supply conduits 65 by capillarity and are led to the ink discharge heads 61 through 64 formed in the print head 28 arranged in the lower portion of the carriage 31 as shown in FIG. 3. When the ink cartridges 71 and 72 are attached to the carriage 31, a pump works to suck first supplies of ink into the respective ink discharge heads 61 through 64. In this embodiment, the structures of the pump for suction and a cap for covering the print head 28 during the suction are not illustrated nor described specifically.

Figure 4:
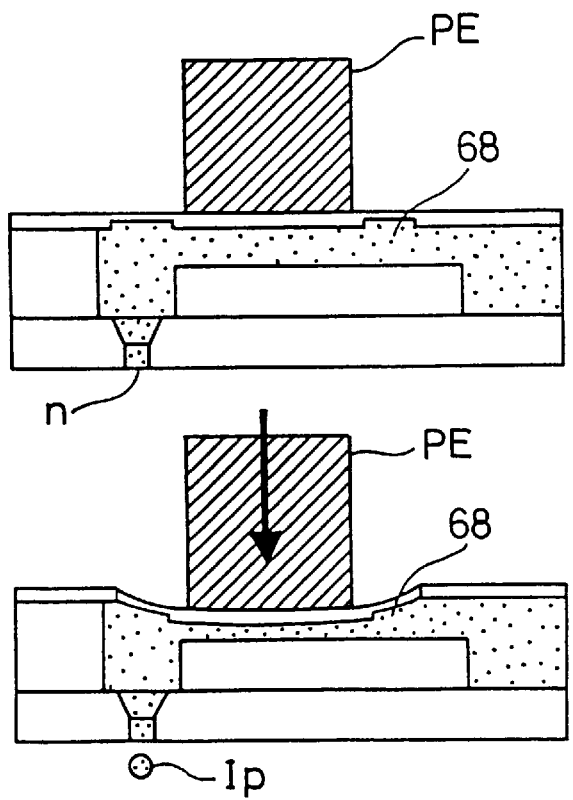
FIG. 4 shows the principle of ink jet.

An array of thirty-two nozzles "n" is formed in each of the ink discharge heads 61 through 64 as shown in FIG. 3. A piezoelectric element PE, which is one of electrically distorting elements and has an excellent response, is provided for each nozzle "n". FIG. 4 illustrates a configuration of the piezoelectric element PE and the nozzle "n". The piezoelectric element PE is disposed at a position that comes into contact with an ink conduit 80 for leading ink to the nozzle "n". As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 80 as shown in the lower part of FIG. 4. The volume of the ink conduit 80 is reduced with an extension of the piezoelectric element PE, and a certain amount of ink corresponding to the reduced volume is sprayed as ink particles Ip from the ends of the nozzle "n" at a high speed. The ink particles Ip soak into the sheet of paper P set on the platen 26, so as to reproduce a print.

In the printer 22 of the embodiment having the hardware structure discussed above, the sheet feed motor 23 rotates the platen 26 and the other related rollers to feed the printing paper P. The carriage motor 24 drives and reciprocates the carriage 31, simultaneously with actuation of the piezoelectric elements PE on the respective ink discharge heads 61 through 64 of the print head 28. The printer 22 accordingly sprays the respective color inks and forms a multi-color image on the printing paper P. Concrete arrangements of the nozzles in the respective ink discharge heads 61 through 64 will be discussed later.

The mechanism for feeding the printing paper P includes a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 for detecting the position of the origin of the carriage 31.

The control circuit 40 includes a CPU (not shown), main memories having a ROM and a RAM (not shown), and a programmable ROM (PROM) 42, which is a rewritable non-volatile memory. The PROM 42 stores dot recording mode information including parameters with respect to a plurality of dot recording modes. The "dot recording mode" denotes the dot recording scheme defined by parameters such as the number of actually used nozzles N and the sub-scan feed amount L. In the specification hereof, the terms "recording scheme" and "recording mode" have substantially the same meanings. Concrete examples of the dot recording modes and their related parameters will be described later. Mode selection information is also stored in the PROM 42 to select a desired mode among the plurality of dot recording modes. For example, when the PROM 42 can store sixteen pieces of dot recording mode information, the mode selection information consists of four-bit data.

As discussed later, the mode for recording an image of the highest image quality is selected as the desired dot recording mode among the plurality of dot recording modes. The quality of an image recorded with each dot recording mode depends upon the characteristics of the arrangement of the nozzle array on the print head 28 (that is, the actual positions of the individual nozzles). For example, the nozzle array may include two nozzles that are deviated in a separating direction from the respective designed positions (or in an approaching direction). When these two nozzles record adjoining two raster lines, a streak of poor image quality portion, which is called "banding", appears between these two raster lines. Th arrangement of the nozzles numbers used for recording the adjoining raster lines is determined according to the dot recording mode (especially according to the sub-scan feed amounts). The desired dot recording mode thus depends upon the characteristics of the print head 28 mounted on the printer (that is, the actual positions of the individual nozzles). The dot recording mode specified by the mode selection information depends upon the characteristics of the print head 28, so that the mode selection information may be regarded as an identifier representing the type of the print head 28. In this specification, the mode selection information is thus referred to as the "head ID". The mode selection information is also referred to as the "mode ID".

The dot recording mode information is read by the printer driver 96 from the PROM 42 when the printer driver 96 (FIG. 1) is installed at the startup of the computer 90. In more concrete terms, the printer driver 96 reads the dot recording mode information corresponding to a desired dot recording mode specified by the mode selection information from the PROM 42. The processes in the rasterizer 97 and the halftone module 99 as well as the main scans and sub-scans are carried out according to the dot recording mode information.

The PROM 42 may be any rewritable non-volatile memory and is, for example, an EEPROM or a flash memory. The dot recording mode information may be stored in a non-rewritable ROM, while it is preferable that the mode selection information is stored in the rewritable non-volatile memory. Plural sets of dot recording mode information may be stored in a storage device other than the PROM 42 or alternatively in the printer driver 96.

FIG. 5 shows an arrangement of ink jet nozzles in the ink discharge heads 61 through 64. The first head 61 has a nozzle array for jetting black ink. Similarly the second through the fourth heads 62 through 64 respectively have nozzle arrays for jetting cyan, magenta, and yellow inks. These four nozzle arrays have identical positions in the sub-scanning direction.

Each of the four nozzle arrays includes a plurality of nozzles n (32 nozzles or 48 nozzles, for example), arranged in a zigzag manner with a constant nozzle pitch k in the sub-scanning direction. The plurality of nozzle n included in each nozzle array may be arranged in alignment, instead of in the zigzag manner. The zigzag arrangement as shown in FIG. 5(A), however, has the advantage of being able to set a smaller nozzle pitch k in the manufacturing process.

FIG. 5(B) shows an arrangement of a plurality of dots formed by one nozzle array. In this embodiment, driving signals are supplied to the piezoelectric elements PE (FIG. 4) of the respective nozzles in order to cause a plurality of dots formed by one nozzle array to be arranged substantially in alignment in the sub-scanning direction, regardless of the arrangement of the ink nozzles; that is, whether the nozzles are arranged in zigzag or in alignment. By way of example, it is assumed that the nozzles are arranged in zigzag as shown in FIG. 5(A) and that the head 61 is scanned rightward in the drawing to form dots. In this case, a group of preceding nozzles 100, 102, . . . receive driving signals at an earlier timing by d/v [second] than a group of following nozzles 101, 103 . . . . Here, d [inch] denotes a pitch between the two nozzle groups in the head 61 (See FIG. 5(A)), and v [inch/second] denotes the scanning speed of the head 61. A plurality of dots formed by one nozzle array are accordingly arranged in alignment in the sub-scanning direction. As described later, all of the plural nozzles provided in each of the heads 61 through 64 are not always used, but only part of the nozzles may be used according to the dot recording scheme.

Figure 6:
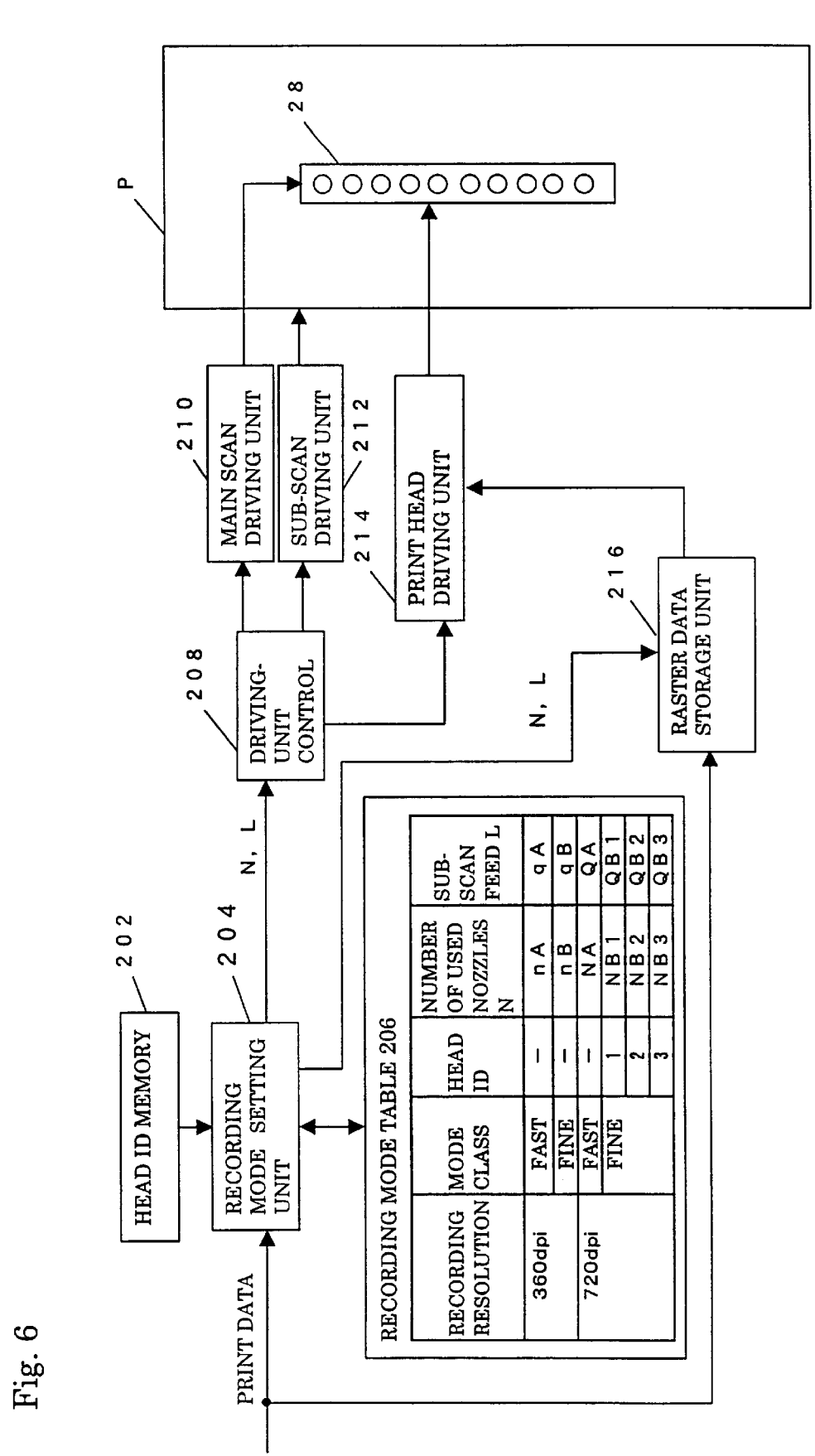
FIG. 6 is a functional block diagram showing the structure relating to the drive and control according to a dot recording mode.

FIG. 6 is a functional block diagram showing the structure relating to driving control according to a dot recording mode. The functional block diagram shows a head ID memory 202, a recording mode setting unit 204, a recording mode table 206, a driving-unit control unit 208, a main scan driving unit 210, a sub-scan driving unit 212, a print head driving unit 214, a raster data storage unit 216, the print head 28, and the printing paper P.

The head ID memory 202 stores a head ID (mode selection information) for specifying a desired dot recording mode. The recording mode table 206 stores plural sets of dot recording mode information. The table 206 includes, among the variety of parameters included in each set of dot recording mode information, a recording resolution, a mode classification, a head ID, the number of used nozzles N, and the sub-scan feed amount L. The recording resolution denotes the resolution of dots recorded on the printing paper P. The mode classification denotes either one of the two available options of "Fast" and "Fine". The "Fine" dot recording modes adopt the overlap scheme (the scheme of recording one raster line with a plurality of nozzles). The "Fast" dot recording modes do not adopt the overlap scheme but records one raster line in one main scan with one nozzle. In the example of FIG. 6, three "Fine" dot recording modes at the recording resolution of 720 dpi are registered corresponding to respective head IDs. The head ID is an identifier for identifying a desired dot recording mode according to the characteristics of the print head 28. The number of used nozzles N denotes the number of nozzles actually used, and the sub-scan feed amount L denotes the feed amount of the printing paper P in the sub-scan in number of dots. Each set of dot recording mode information includes a variety of other parameters for defining operations of the main scan and the sub-scan, although they are omitted from the illustration of FIG. 6.

The recording mode setting unit 204 supplies parameters for defining operations of the main scan and the sub-scan to the driving-unit control unit 208 and to the raster data storage unit 216 according to the print data transmitted from the computer 90 and the head ID (mode selection information) output from the head ID memory 202. The print data here is the final color image data FNL shown in FIG. 1. A non-illustrated header part of the print data includes data representing the recording resolution and the mode classification. The recording mode setting unit 204 specifies the dot recording mode used for printing, based on the recording resolution, the mode classification, and the head ID fed from the head ID memory 202. Since the plurality of dot recording modes corresponding to head IDs are registered only for the "Fine" mode at 720 dpi, one dot recording mode is specified only by the recording resolution and the mode classification, irrespective of the head ID, for the other modes,.

The recording mode setting unit 204 supplies the scan parameters of the selected dot recording mode, which include the number of used nozzles N and the sub-scan feed amount L, to the driving-unit control unit 208 and the raster data storage unit 216. As discussed later, the number of used nozzles N and the sub-scan feed amount L may be varied for each scan, and the scan parameters including these data are thus fed to the respective units 208 and 216, prior to each scan.

The raster data storage unit 216 stores print data in a non-illustrated buffer memory, according to the scan parameters including the number of used nozzles N and the sub-scan feed amount L. The driving-unit control unit 208 controls the main scan driving unit 210, the sub-scan driving unit 212, and the print head driving unit 214, according to the scan parameters including the number of used nozzles N and the sub-scan feed amount L.

The head ID memory 202 and the recording mode table 206 are provided in one PROM 42 shown in FIG. 2. The recording mode setting unit 204, the driving-unit control unit 208, and the raster data storage unit 216 are provided in the control circuit 40 shown in FIG. 2. The main scan driving unit 210 is embodied by the feeding mechanism of the carriage 31 including the carriage motor 24 shown in FIG. 2, whereas the sub-scan driving unit 212 is embodied by the feeding mechanism of the paper including the sheet feed motor 23. The print head driving unit 214 is embodied by a circuit including the piezoelectric element PE of each nozzle.

B. Basic Conditions of Middle Area Recording Scheme

Before describing the dot recording schemes used in the embodiment of the present invention, the following describes basic conditions required for general recording schemes.

FIGS. 7(A) and 7(B) show basic conditions of a general dot recording scheme when the number of scan repeats s is equal to one. FIG. 7(A) illustrates an example of sub-scan feeds with five nozzles, and FIG. 7(B) shows parameters of the dot recording scheme. In the drawing of FIG. 7(A), solid circles including numerals indicate the positions of the five nozzles in the sub-scanning direction after each sub-scan feed. The encircled numerals 0 through 3 denote the nozzle numbers. The five nozzles are shifted in the sub-scanning direction every time when one main scan is concluded. Actually, however, the sub-scan feed is executed by feeding a printing paper with the sheet feed motor 23 (FIG. 2).

As shown on the left-hand side of FIG. 7(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 7(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area" (or the "non-effective print area)". All the area which is scanned with the nozzles (including both the effective record area and the non-effective record area) is referred to as the nozzle scan area.

Various parameters related to the dot recording scheme are shown in FIG. 7(B). The parameters of the dot recording scheme include the nozzle pitch k [dots], the number of used nozzles N, the number of scan repeats s, number of effective nozzles Neff, and the sub-scan feed amount L [dots].

In the example of FIGS. 7(A) and 7(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 7(A) and 7(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 7(B) shows the sub-scan feed amount L, its accumulated value ΣL, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 7(A)). For example, as shown in FIG. 7(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 7(A)). Similarly, the position of the nozzles after the second sub-scan feed is ΣL(=8) dots away from the initial position so that the offset F is 2. The position of the nozzles after the third sub-scan feed is ΣL(=12) dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by (ΣL)%k, where ΣL is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k·1).

Condition c3: Average sub-scan feed amount (ΣL/k) is equal to the number of used nozzles N. In other words, the accumulated value ΣL of the sub-scan feed amount L for the whole feed cycle is equal to a product (N×k) of the number of used nozzles N and the nozzle pitch k.

The above conditions can be understood as follows. Since (k-1) raster lines are present between adjoining nozzles, the number of sub-scan feeds required in one feed cycle is equal to k so that the (k-1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k-1). The second condition c2 is accordingly required.

When the first and the second conditions c1 and c2 are satisfied, each of the N nozzles records k raster lines in one feed cycle. Namely N×k raster lines can be recorded in one feed cycle. When the third condition c3 is satisfied, the nozzle position after one feed cycle (that is, after the k sub-scan feeds) is away from the initial position by the N×k raster lines as shown in FIG. 7(A). Satisfying the above first through the third conditions c1 to c3 thus prevents skipping or overwriting of raster lines to be recorded in the range of N×k raster lines.

FIGS. 8(A) and 8(B) show the basic conditions of a general dot recording scheme when the number of scan repeats s is no less than 2. When the number of scan repeats s is 2 or greater, each raster line is recorded with s different nozzles. In the description hereinafter, the dot recording scheme adopted when the number of scan repeats s is not less than 2 is referred to as the "overlap scheme".

The dot recording scheme shown in FIGS. 8(A) and 8(B) amounts to that obtained by changing the number of scan repeats s and the sub-scan feed amount L among the dot recording scheme parameters shown in FIG. 7(B). As will be understood from FIG. 8(A), the sub-scan feed amount L in the dot recording scheme of FIGS. 8(A) and 8(B) is a constant value of two dots. In FIG. 8(A), the nozzle positions after the odd-numbered sub-scan feeds are indicated by the diamonds. As shown on the right-hand side of FIG. 8(A), the dot positions recorded after the odd-numbered sub-scan feed are shifted by one dot in the main scanning direction from the dot positions recorded after the even-numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s-1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 8(A). In one possible scheme, dot recording is executed at the positions indicated by the circles shown in the right-hand side of FIG. 8(A) after the first sub-scan feed, and is executed at the shifted positions indicated by the diamonds after the fourth sub-scan feed.

The lower-most row of the table of FIG. 8(B) shows the values of the offset F after each sub-scan feed in one feed cycle. One feed cycle includes six sub-scan feeds. The offsets F after each of the six sub-scan feeds assume every value between 0 and 2, twice. The variation in the offset F after the first through the third sub-scan feeds is identical with that after the fourth through the sixth sub-scan feeds. As shown on the left-hand side of FIG. 8(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of not less than 2, the first through the third conditions c1 to c3 discussed above are rewritten into the following conditions c1' through c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k-1), s times.

Condition c3': Average sub-scan feed amount $\{\Sigma L/k \times s)\}$ is equal to the number of effective nozzles Neff (=N/s). In other words, the accumulated value $\Sigma L$ of the sub-scan feed amount L for the whole feed cycle is equal to a product $\{\text{Neff} \times (k \times s)\}$ of the number of effective nozzles Neff and the number of sub-scan feeds (k×s).

The above conditions c1' through c3' hold even when the number of scan repeats s is one. This means that the conditions c1' through c3' generally hold for the dot recording scheme irrespective of the number of scan repeats s. When these three conditions c1' through c3' are satisfied, there is no skipping or overwiting of dots recorded in the effective record area. If the overlap scheme is applied (if the number of scan repeats s is not less than 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1' through c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

C. Examples of Various Dot Recording Schemes

FIG. 9 shows a first dot recording scheme with the dot pitch k equal to 4 dots. The scan parameters of this dot recording scheme are shown at the bottom of FIG. 9, where the nozzle pitch k is equal to 4 dots, the number of used nozzles N is equal to 8, the number of scan repeats s is equal to 1, and the number of effective nozzles Neff is equal to 8.

In the example of FIG. 9, nozzle numbers #0 through #7 are allocated to the eight used nozzles from the top. In the first dot recording scheme for k=4, four sub-scan feeds constitute one cycle, and the amount of the sub-scan feed L is varied in the sequence of 10, 7, 6, and 9 dots. This means that a plurality of different values are used for the sub-scan feed amount L. The positions of the eight nozzles in the respective sub-scan feeds are shown by four different figures. The right-hand side of FIG. 9 shows by which nozzle and after which sub-scan feed the dots on the raster lines in the effective record area are to be recorded. In the first dot recording scheme for k=4, a non-effective record area of 20 raster lines is present before the effective record area. Namely the effective record area starts at the 21st raster line from the upper end of the nozzle scan area (the range including the effective record area and the non-effective record area). The nozzle position in the first main scan is set to be apart from the upper end of the printing paper by a predetermined distance. The earlier starting position of the effective record area enables the dots to be recorded from the position closer to the upper end of the printing paper.

FIGS. 10(A) and 10(B) show the scan parameters and the raster numbers of the effective raster lines recorded by the respective nozzles in the first dot recording scheme for k=4. The table of FIG. 10(A) shows the sub-scan feed amount L and its summation $\Sigma L$ for each sub-scan feed and the nozzle offset F after each sub-scan feed.

The parameters shown in FIG. 10(A) satisfy the three conditions c1' through c3' discussed above. The number of sub-scan feeds in one cycle is equal to the product (k×s=4) of the nozzle pitch k(=4) and the number of scan repeats s(=1) (the first condition c1'). The nozzle offset F after each sub-scan feed in one cycle assumes the values in the range of 0 to k-1) (i.e., in the range of 0 to 3) (the second condition c2'). The average sub-scan feed amount ($\Sigma L/k$) is equal to the number of effective nozzles Neff(=8) (the third condition c3'). The first dot recording scheme for k=4 accordingly satisfies the fundamental requirements; that is, there is no dropout or overlap of recorded raster lines in the effective record area.

The first dot recording scheme for k=4 also has the following two features. The first feature is that the nozzle pitch k and the number of used nozzles N are integers which are no less than 2 and which are not relatively prime. The second feature is that a plurality of different values are used for the sub-scan feed amount L. As discussed previously in the prior art, the conventional dot recording scheme sets the number of nozzles N and the nozzle pitch k at the integers that are relatively prime. The number of nozzles N actually used among a large number of nozzles provided is thus restricted to the value that is prime to the nozzle pitch k. In other words, the problem of the conventional process is that the nozzles provided are not sufficiently used in many cases. Application of the dot recording scheme having the first feature that the nozzle pitch k and the number of used nozzles N are integers which are no less than 2 and which are not relatively prime, on the other hand, advantageously increases the number of used nozzles as many as possible. The second feature allows the fundamental requirement that there is no dropout or overlap of recorded raster lines in the effective record area to be satisfied when the dot recording scheme has the first feature. There will be dropout or overlap of raster lines if the dot recording scheme that has the first feature and a fixed sub-scan feed amount L is applied.

FIG. 10(B) shows the raster numbers of the effective raster lines recorded by the respective nozzles in the main scan after each sub-scan feed. The left-hand side of FIG. 10(B) shows the nozzle numbers #0 through #7. The values on the right-hand side of the nozzle numbers represent which raster lines in the effective record area are recorded by the respective nozzles after the 0th to 7th sub-scan feeds. By way of example, in the main scan after the 0th sub-scan feed (that is, in the first main scan for recording the effective record area), the nozzles #5 through #7 record the 1st, 5th, and 9th effective raster lines. In the main scan after the 1st sub-scan feed, the nozzles #3 through #7 record the 3rd, 7th, 11th, 15th, and 19th effective raster lines. The term "effective raster lines" here denotes the raster lines in the effective record area.

It can be understood that, in FIG. 10(B), a difference between raster numbers of the effective raster lines recorded during one main scan is equal to the nozzle pitch k(=4). One scan cycle accordingly records N×k (that is, 32) raster lines. Since any successive nozzles are apart from each other by the nozzle pitch k, one cycle does not record 32 sequential raster lines as clearly understood from FIG. 9. FIG. 10(B) shows which nozzles are used to record the first 32 raster lines in the effective record area.

In FIG. 10(B), the effective raster numbers written in the brackets show that the raster lines at the positions having the equivalent scanning conditions have been recorded in the previous cycle. Namely the difference obtained by subtracting 32 from the numeral in the brackets indicates the equivalent raster line number. For example, the raster line of the effective raster number 36 recorded by the nozzle #0 is present at the position having the equivalent scanning conditions to those of the raster line of the effective raster number 4.

FIG. 11 shows the nozzle numbers for recording the effective raster lines in the first dot recording scheme for k=4. The numerals 1 through 31 on the left-end column of FIG. 11 show the effective raster numbers. The right-hand side of FIG. 11 shows the positions of the effective raster lines recorded by the eight nozzles #0 through #7 in the main scans after the respective sub-scan feeds. For example, in the main scan after the 0th sub-scan feed, the nozzles #5 through #7 record the 1st, 5th, and 9th effective raster lines, respectively. Comparison between FIG. 11 and FIG. 10(B) clearly shows the relationship between the effective raster lines and the nozzle numbers.

Four different symbols "·", "×", "↑", and "↓" in the second-left column of FIG. 11 show whether or not the adjoining raster lines have already been recorded before the recording of each raster line. The respective symbols have the following meaning:

↓: Only one raster line immediately below itself has already been recorded.

↑: Only one raster line immediately above itself has already been recorded.

×: Both raster lines above and below itself have already been recorded.

·: Neither of the raster lines above and below itself have been recorded.

The recording state of the adjoining raster lines above and below each raster line affects the image quality of the raster line being recorded. The effects on the image quality are ascribed to the dryness of ink on the adjoining raster lines that have already been recorded and to sub-scan feed errors. If the pattern by the four different symbols appears at a relatively large interval, it may deteriorate the image quality of the whole image. In the first dot recording scheme shown in FIG. 11, however, the pattern by the four different symbols does not show any clear periodicity. It is accordingly expected that the first recording scheme causes less deterioration of the image quality due to this reason but enables an image of relatively good image quality to be recorded.

The third-left column of FIG. 11 shows the value $\Delta$ representing how many sub-scan feeds have been executed at the maximum between recording of the adjoining raster line and recording of each raster line. The value $\Delta$ is hereinafter referred to as the "sub-scan feed number difference". By way of example, the second effective raster line is recorded by the nozzle #1 after the 2nd sub-scan feed, whereas the first raster line is recorded by the nozzle #5 after the 0th sub-scan feed and the third raster line is recorded by the nozzle #3 after the 1st sub-scan feed. The sub-scan feed number difference $\Delta$ is accordingly equal to 2 with respect to the second raster line. In a similar manner, the fourth raster line is recorded after three sub-scan feeds have been executed since recording of the fifth raster line. The sub-scan feed number difference $\Delta$ is thus equal to 3 with respect to the fourth raster line.

Since one cycle consists of k(=4) sub-scan feeds, the sub-scan feed number difference $\Delta$ may be the value in the range of 0 to k. In the first dot recording scheme for k=4, it is understood that the maximum sub-scan feed number difference $\Delta$ is equal to 3, which is smaller than the possible upper limit value k(=4).

It is ideal that the sub-scan feed is carried out strictly by the amount equal to an integral multiple of the dot pitch. In the actual state, however, the sub-scan feed has some feeding error. The sub-scan feed error is accumulated at every time of sub-scan feed. When a large number of sub-scan feeds are interposed between recording of adjoining two raster lines, the accumulated sub-scan feed error may cause a positional misalignment of the adjoining two raster lines. As mentioned above, the sub-scan feed number difference $\Delta$ shown in FIG. 11 denotes the number of sub-scan feeds carried out between recording of the adjoining raster lines. The smaller sub-scan feed number difference $\Delta$ is preferable, in order to minimize the positional misalignment of the adjoining raster lines due to the accumulated sub-scan feed error. In the first dot recording scheme for k=4 shown in FIG. 11, the sub-scan feed number difference Δ is not greater than 3 and is smaller than the upper limit value 4. This allows a favorable image to be recorded from this viewpoint.

FIGS. 12(A) and 12(B) show the scan parameters and the raster numbers of the effective raster lines recorded by the respective nozzles in a second dot recording scheme for k=4 in the embodiment of the present invention. FIGS. 12(A) and 12(B) correspond to FIGS. 10(A) and 10(B) in the first dot recording scheme discussed above. The first and second dot recording schemes for k=4 have the same nozzle pitch k and enable images to be recorded at an identical resolution [dpi]. The same number of effective nozzles Neff allows images to be recorded at an identical recording speed. The difference between the first and second dot recording scheme for k=4 is only the sequence of the sub-scan feed amounts L. In the first dot recording scheme for k=4, the sub-scan feed amount L varies in the sequence of 10, 7, 6, and 9 dots. In the second dot recording scheme for k=4, on the other hand, the sub-scan feed amount varies in the sequence of 7, 6, 9, and 10 dots.

Like the first dot recording scheme for k=4, the second dot recording scheme for k=4 has the first feature that the nozzle pitch k and the number of used nozzles N are integers which are no less than 2 and which are not relatively prime, and the second feature that a plurality of different values are used for the sub-scan feed amount L.

FIG. 13 shows the nozzle numbers for recording the effective raster lines in the second dot recording scheme for k=4. FIG. 13 corresponds to FIG. 11 in the first dot recording scheme for k=4. Like the first dot recording scheme for k=4 shown in FIG. 11, in the second dot recording scheme for k=4, the pattern of the symbols @ representing the recording state of the adjoining raster lines above and below each raster line does not have any clear periodicity. It is accordingly expected that the second dot recording scheme also gives an image of relatively good quality. Since the sub-scan feed number difference Δ is not greater than 3, this process enables a favorable image to be recorded from the viewpoint of minimizing the accumulated sub-scan feed error.

As described above, both the first and second dot recording scheme for k=4 have the first feature that the nozzle pitch k and the number of used nozzles N are integers which are not less than 2 and which are not relatively prime, and the second feature that a plurality of different values are used for the sub-scan feed amounts L. In this case, there may be a large number of equivalent dot recording schemes that are different only in the sequence of the sub-scan feed amounts L. When there are a plurality of equivalent dot recording schemes that have an identical resolution and an identical recording speed but a difference in sequence of the sub-scan feed amounts L, the individual printers have different choices for the dot recording scheme attaining the highest image quality. This is because the quality of an image recorded by each printer depends upon the combination of the manufacturing error of the printer (for example, the error of the nozzle pitch and the sub-scan feed error) with the scanning technique adopted in the dot recording scheme (mainly the sub-scan feed amount). When there are a large number of alternative dot recording schemes having a difference only in sequence of the sub-scan feed amounts, such as the first and second dot recording schemes, it is preferable to select the dot recording scheme attaining the higher image quality for each individual printer.

Although not being specifically illustrated, the effective record area in the second dot recording scheme for k=4 starts at the 20th raster line from the upper end of the nozzle scanning range (the range including the effective record area and the non-effective record area). In the first dot recording scheme for k=4 shown in FIG. 9, on the other hand, the effective record area starts at the 21st raster line from the upper end of the nozzle scanning range. This means that the starting position of the effective record area in the second dot recording scheme for k=4 is closer by one raster line to the upper end of the printing paper, compared with the first dot recording scheme for k=4. Such difference in starting position of the effective record area is ascribed to the difference in the sequence of the sub-scan feed amounts L between the first dot recording scheme and the second dot recording scheme for k=4. The identical combination of four values is used for the sub-scan feed amount L in both the first and second dot recording schemes for k=4, but the sequence of the values is different. Whereas the sub-scan feed amount L varies in the sequence of 10, 7, 6, and 9 in the first dot recording scheme for k=4, the sub-scan feed amount L varies in the sequence of 7, 6, 9, and 10 in the second dot recording scheme for k=4. The starting position of the effective record area is closer to the upper end of the printing paper in the second dot recording scheme for k=4. This may be attributable to the fact that the first sub-scan feed amount L(=7) in the second dot recording scheme for k=4 is smaller than that of the first sub-scan feed amount L(=10) in the first dot recording scheme for k=4.

This can be understood from the following example. Consider here a dot recording scheme in which the nozzle pitch k is equal to 12 dots and one cycle includes twelve scans. Plural combinations including seven feeds of 17 dots and five feeds of 5 dots are available for the sub-scan feed amount L in this dot recording scheme. Among all the alternative dot recording schemes, the dot recording scheme that initially carries out five sub-scan feeds of 5 dots and subsequently seven sub-scan feeds of 17 dots will have the effective record area which starts at the 117th raster line from the upper end of the nozzle scanning range (the range including the non-effective record area and the effective record area). The dot recording scheme that initially carries out seven sub-scan feeds of 17 dots and subsequently five sub-scan feeds of 5 dots will have, on the other hand, the effective record area which starts at the 129th raster line from the upper end of the nozzle scanning range. Compared with the dot recording scheme that repeats the sub-scan feeds of 5 dots first, the dot recording scheme that repeats the sub-scan feeds of 5 dots first enables recording of the effective dots to start from the position closer to the upper end of the printing paper by 12 raster lines.

As clearly understood from this example, in general, the smaller amounts for initial several sub-scan feeds among the plurality of sub-scan feeds included in one cycle tends to start the recording from the position closer to the upper end of the printing paper. From this viewpoint, it is preferable to select the dot recording scheme which has smaller amounts L for a predetermined number of (for example, a couple of) initial sub-scan feeds, among the plurality of alternative dot recording schemes. In other words, it is preferable to select the sequence having smaller amounts L for a predetermined number of initial sub-scan feeds, among the plurality of choices having an identical combination of plural different values but a different sequence of the values. As shown by the comparison between the first and second recording schemes for k=4, there is a better possibility that smaller amounts of the first sub-scan feed L enables the recording to start from the position closer to the upper end of the printing paper. It is thus especially preferable to select the dot recording scheme which has a smaller first sub-scan feed amount L.

The starting position of the effective record area by each dot recording scheme can be known in advance from the scan parameters. It is accordingly possible to select the dot recording scheme which has the earliest starting position of the effective record area (that is, closest to the upper end of the printing paper) among the plurality of alternative dot recording schemes. In a similar manner, it is possible to select the dot recording scheme having the latest end position of the effective record area (that is, closest to the lower end of the printing paper) among the plurality of alternative dot recording schemes.

FIGS. 14(A) and 14(B) show the scan parameters and the raster numbers of the effective raster lines recorded by the respective nozzles in a third dot recording scheme for k=4 in the embodiment of the present invention. The third dot recording scheme for k=4 has the same nozzle pitch k as that in the first and second dot recording schemes but a different number of used nozzles N. The third dot recording scheme has parameter of k=4 and N=7, which are relatively prime. The sub-scan feed amount L is fixed to 7 dots. The three conditions c1' through c3' discussed above are all satisfied in this dot recording scheme.

FIG. 15 shows the nozzle numbers for recording the effective raster lines in the third dot recording scheme for k=4. Unlike the first and second dot recording schemes for k=4 (FIGS. 11 and 13), in the third dot recording scheme for k=4, the pattern of the symbols @ representing the recording state of the adjoining raster lines above and below each raster has rather clear periodicity. Especially the raster lines whose sub-scan feed number difference Δ is equal to 3 appear in a rather periodical manner. From the viewpoint of the image quality, the first and second dot recording schemes for k=4 are thus favorable over the third dot recording scheme for k=4.

From the viewpoint of the recording speed, the first and second dot recording schemes for k=4 are favorable over the third dot recording scheme for k=4. This is because the first and second dot recording schemes for k=4 use eight nozzles and simultaneously record eight raster lines, whereas the third dot recording scheme for k=4 uses seven nozzles and simultaneously records seven raster lines. The first through third dot recording schemes for k=4 record dots at an identical resolution, but the first and second dot recording schemes for k=4 are favorable over the third dot recording scheme for k=4 from the viewpoints of the image quality and the recording speed. As described previously, in the actual printer, however, it is possible that the third dot recording scheme for k=4 attains better image quality than the first and second dot recording schemes for k=4. When a plurality of dot recording schemes are available to execute the recording at an identical resolution and at a substantially equal recording speed, it is desirable to select an appropriate dot recording scheme for each individual printer. The dot recording schemes having "the substantially equal recording speed" means that their difference in the number of effective nozzles Neff is within about 10%.

FIGS. 16(A)–16(C) show the scan parameters in fourth through sixth dot recording schemes for k=4. In the fourth through sixth dot recording schemes for k=4, the numbers of used nozzles N in the first through third dot recording schemes for k=4 are doubled respectively, and the number of scan repeats s is set equal to 2. The numbers of effective nozzles Neff in the fourth through sixth dot recording schemes for k=4 are thus identical with those in the first through third dot recording schemes for k=4. The same repetition patterns are adopted for the sub-scan feed amount L. Since the number of scan repeats s is set equal to 2, the cycle of the sub-scan feed amount L in the first through third dot recording schemes for k=4 is repeated twice in the fourth through sixth dot recording schemes for k=4.

The nozzle pitch k in the fourth through sixth dot recording schemes is identical with that in the first through third dot recording schemes discussed above, so that images can be recorded at an identical resolution. In the fourth through sixth dot recording schemes for k=4, however, the dots on each raster line are recorded not by one identical nozzle but by a plurality of different nozzles. Even when the characteristics of the nozzles (for example, the pitch and the spouting characteristics) have some variation, this arrangement effectively prevents the characteristics of a specific nozzle from affecting the whole of each raster line, thereby improving the image quality.

In the fourth and fifth dot recording schemes for k=4, the number of effective nozzles Neff is equal to 8, which is the same as that in the first and second dot recording schemes for k=4. These four dot recording schemes accordingly have an identical recording speed. In a similar manner, the third and sixth dot recording scheme for k=4 have an identical recording speed. In the fourth through sixth dot recording schemes for k=4, the dots are intermittently recorded as described previously with FIGS. 8(A) and 8(B). The additional processing time is thus required for the printer driver 96 to generate the driving signals for intermittent operations. When the speed of generating the driving signals is the rate-determining factor in the process of image recording, the first through third dot recording schemes for k=4 have a higher actual recording speed than that of the fourth through sixth dot recording schemes for k=4. The term "recording speed" used in this application without any explanation denotes the rate that is simply proportional to the number of effective nozzles Neff (that is, the net number of raster lines that can be recorded by one main scan).

The parameters of the first through third dot recording schemes for k=4 are registered as the three alternative dot recording schemes in the recording mode table 206 (FIG. 6). Alternatively, the parameters for the fourth through sixth dot recording schemes for k=4 may be registered in the recording mode table 206. It is preferable that a plurality of alternative dot recording schemes record images at least at an identical recording resolution. Different dot IDs are allocated to the plurality of alternative dot recording schemes. As discussed below, the dot recording scheme that is expected to attain the highest image quality is selected among the plurality of alternative dot recording schemes and used for the actual image recording.

FIGS. 17(A)–17(D) show the scan parameters of the first through fourth dot recording schemes for k=6. The scan parameters of the first dot recording scheme for k=6 shown in FIG. 17(A) include the nozzle pitch k=6 dots, the number of used nozzles N=48, the number of scan repeats s=2, and the number of effective nozzles Neff=24. Six different values (20, 27, 22, 28, 21, and 26) are used for the sub-scan feed amount L [dots]. The scan parameters of the second dot recording scheme for k=6 shown in FIG. 17(B) are identical with those of the first dot recording scheme for k=6, except the sub-scan feed amount L.

The scan parameters of the third dot recording scheme for k=6 shown in FIG. 17(C) include the nozzle pitch k=6 dots, the number of used nozzles N=47, the number of scan repeats s=2, and the number of effective nozzles Neff =23.5. Two different values (21 and 26) are used for the sub-scan feed amount L [dots]. The scan parameters in the fourth dot recording scheme for k=6 shown in FIG. 17(D) are identical with those of the third dot recording scheme for k=6, except the sub-scan feed amount L.

The number of used nozzles N is equal to 48 in the first and second dot recording schemes for k=6, whereas the number of used nozzles N is equal to 47 in the third and fourth dot recording schemes for k=6. Namely there is a difference in the number of used nozzles N between these two pairs of recording schemes. The difference in the number of used nozzles N is, however, not greater than about 10%, so that there is no significant difference in the recording speed. The plurality of dot recording schemes having an identical recording resolution and a substantially equal recording speed may be registered as the three alternative dot recording schemes in the recording mode table 206 (FIG. 6).

Figure 18:
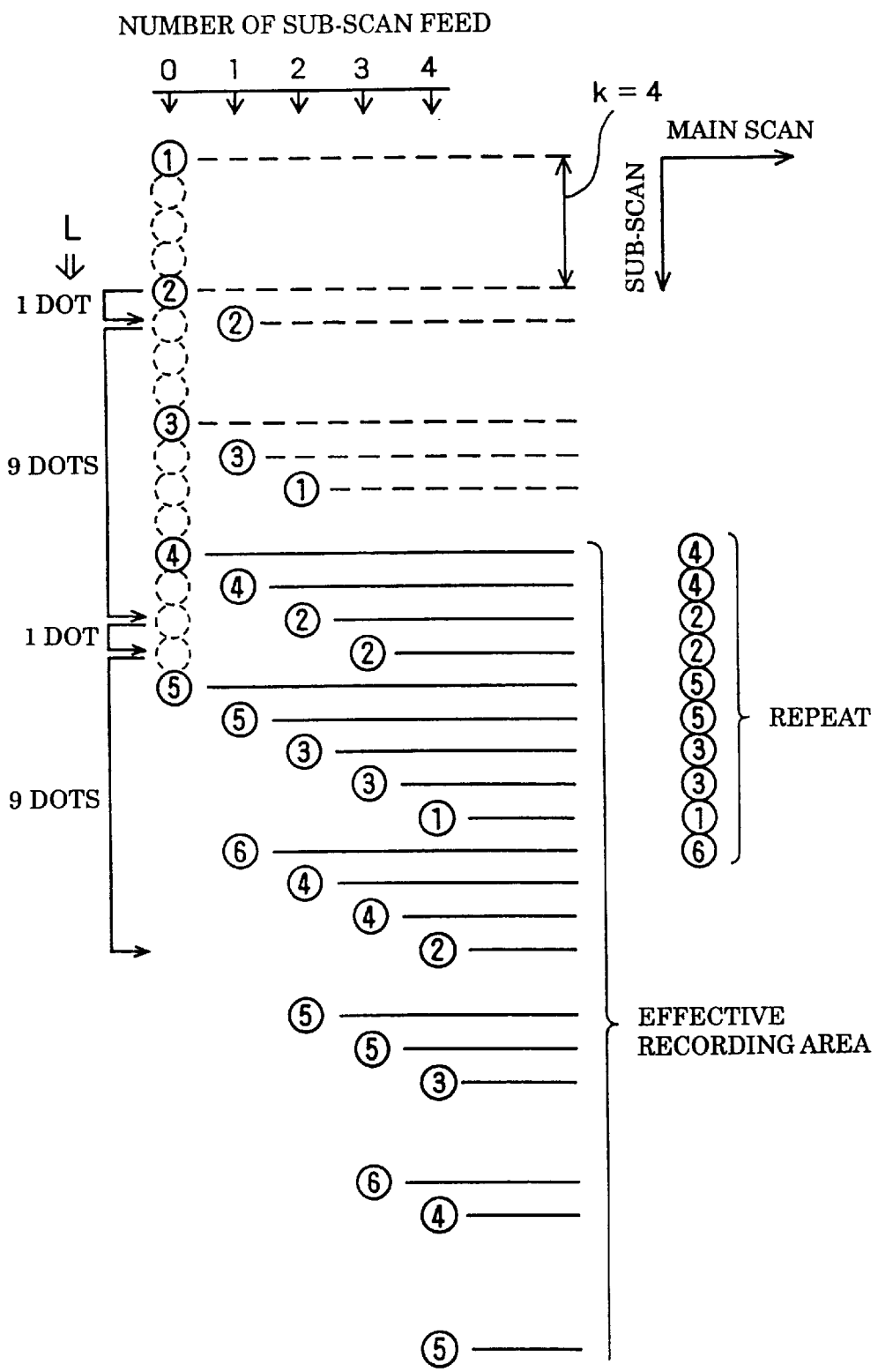
FIG. 18 shows a seventh dot recording scheme for k=4.

Although the nozzles used for each main scan are fixed in the variety of embodiments discussed above, the nozzles used may, however, be selected for each main scan. FIG. 18 shows a seventh dot recording scheme for k=4, in which the used nozzles are selected for each main scan. In this dot recording scheme, the sub-scan feed amounts L of 1 dot and 9 dots are repeated. While the number of used nozzles N is fixed to 5, the working nozzle numbers are changed in each main scan. The first through fifth nozzles are used for the main scan after even-numbered sub-scan feeds, whereas the second through sixth nozzles are used for the main scan after odd-numbered sub-scan feeds. The nozzles that are not used for recording are omitted from the illustration.

Figure 19:
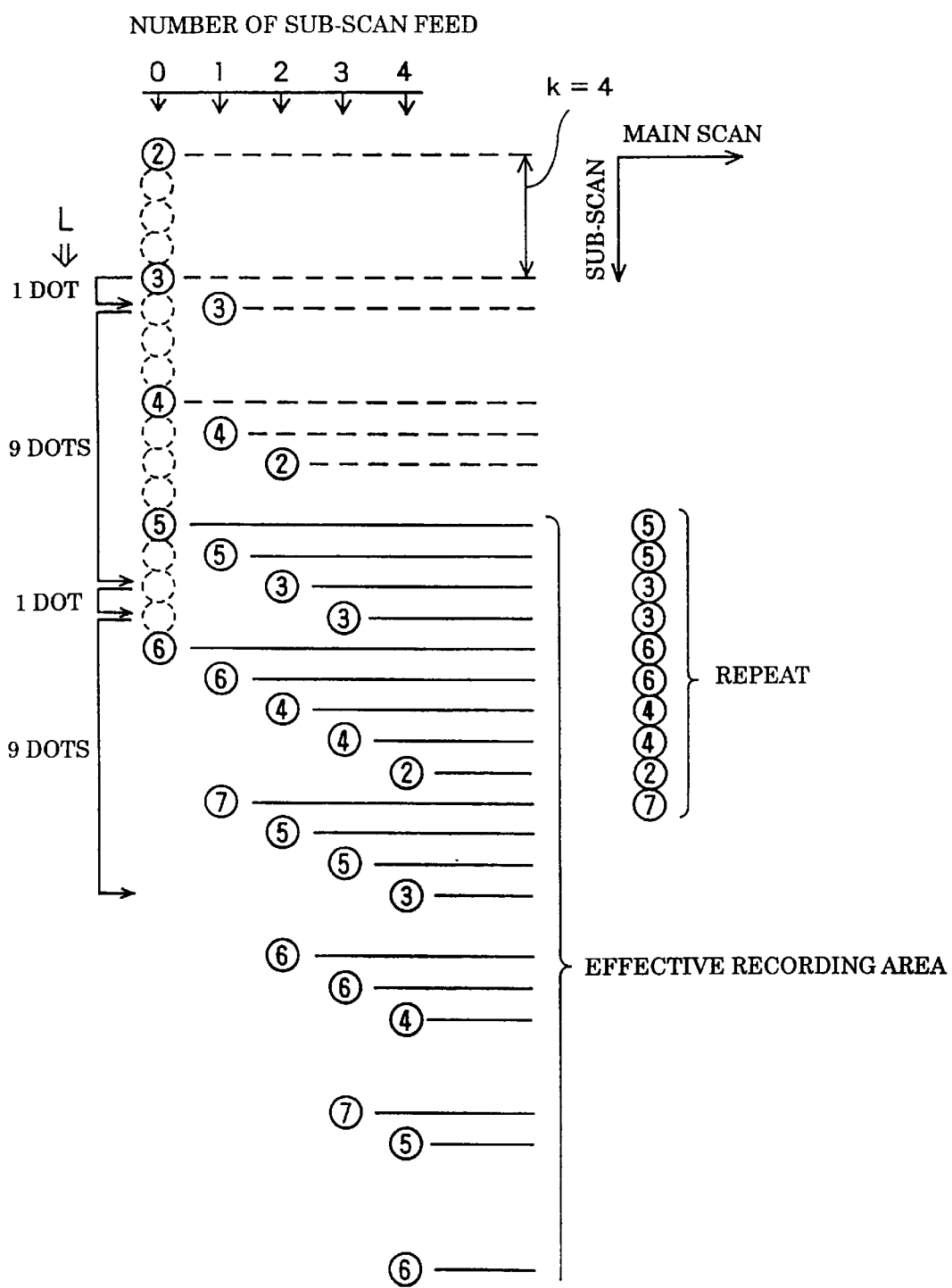
FIG. 19 shows an eighth dot recording scheme for k=4.

FIG. 19 shows an eighth dot recording scheme for k=4, in which the used nozzles are selected for each main scan. The cycle of sub-scan feeds in this dot recording scheme is identical with that discussed above with FIG. 18, but the working nozzle numbers are different. The second through sixth nozzles are used for the main scan after even-numbered sub-scan feeds, whereas the third through seventh nozzles are used for the main scan after odd-numbered sub-scan feeds.

The nozzle numbers of the nozzles used for recording the respective raster lines in the effective record area are shown on the right-hand sides of FIGS. 18 and 19. Comparison between these nozzle numbers shows that the selection of the used nozzles changes the sequence of the nozzle numbers used for recording the raster lines. The sequence of the nozzle numbers used for recording the raster lines significantly affects the image quality as discussed below. The actual pitch of the nozzles in the nozzle array is varied slightly because of the manufacturing error of the nozzle array. The manufacturing error may cause a gap between the adjoining raster lines or a significant overlap of the adjoining raster lines, which results in banding (a poor image quality portion extending in the main scanning direction). Even if the same print head is used, the banding easily occurs in some cases and it hardly occurs in other cases, depending on the sequence of the nozzle numbers used for recording the raster lines.

A plurality of dot recording schemes which have different working nozzle numbers as shown in FIGS. 18 and 19 may be registered as the possible choices in the recording mode table 206 (FIG. 6). This arrangement enables selection of the recording scheme that hardly causes the banding.

A plurality of dot recording schemes that regulate the number of used nozzles N in each scan may be registered as the plurality of alternative dot recording schemes. One available process uses N1 nozzles in the main scan after even-numbered sub-scan feeds and N2 nozzles (N1 and N2 are different integers) in the main scan after odd-numbered sub-scan feeds. Regulation of the number of used nozzles in each main scan further increases the degree of freedom in setting the scan parameters and thereby enhances the possibility of selecting an appropriate dot recording scheme. When it is assumed that the number of scan repeats s is equal to 1 in the above case, the average number of effective nozzles Neff is equal to (N1+N2)/2. It is thought that the recording speed is substantially proportional to this average number of effective nozzles Neff.

By considering the above embodiments, a plurality of dot recording schemes which have at least an identical recording resolution and a substantially equal recording speed are adopted as the plurality of alternative dot recording schemes. A variety of groups each including a plurality of alternative dot recording schemes and having the following different features can be thought:

(Feature 1): To have an identical recording speed (the average number of effective nozzles).

(Feature 2): To include schemes that use a fixed value for the sub-scan feed amount L.

(Feature 3): To include schemes that use a plurality of different values for the sub-scan feed amount L.

(Feature 4): To include schemes that use a plurality of different values for the sub-scan feed amount L and have different sequences of the values.

(Feature 5): To include schemes that have the number of scan repeats of not less than 2.

(Feature 6): To include schemes that use different nozzles in each main scan.

(Feature 7): To include schemes that use different numbers of nozzles in each main scan.

In many cases, each group including the plurality of alternative dot recording schemes (hereinafter referred to as the "selection group") simultaneously has some of these Features. The selection group including the first through third dot recording schemes for k=4 shown in FIGS. 10(A) through 15 has Features 2, 3, and 4. The selection group including the first through fourth dot recording schemes for k=6 shown in FIGS. 17(A)–17(D) has Features 3, 4, 5, and 7. Appropriate combination of Features 1 through 7 enhances the degree of freedom in setting the scan parameters of a dot recording scheme, thereby enabling to define a dot recording scheme for attaining higher image quality.

When the selection group having the variety of Features is registered in the recording mode table 206 (FIG. 6), there is a better possibility of selecting an appropriate dot recording scheme attaining high image quality according to the characteristics of the print head 28.

From the viewpoint of reducing the banding, it is desirable that each dot recording scheme included in one selection group has a different combination of nozzles used for recording the adjoining raster lines from the combinations attained by the other dot recording schemes. More specifically, it is preferable that there is a difference in at least one of the two scanning conditions, that is, the sequence of the sub-scan feed amounts and the nozzles used in each main scan, between each dot recording scheme and another dot recording scheme included in the same group. The "different sequence of the sub-scan feed amounts" means that the orders of the sub-scan feed amounts L are different. The "different nozzles used in each main scan" means both the case in which the number of used nozzles is different and the case in which the number of used nozzles is identical but the positions of the used nozzles are different as shown in FIGS. 18 and 19.

D. Selection of Desired Dot recording scheme

Figure 20:
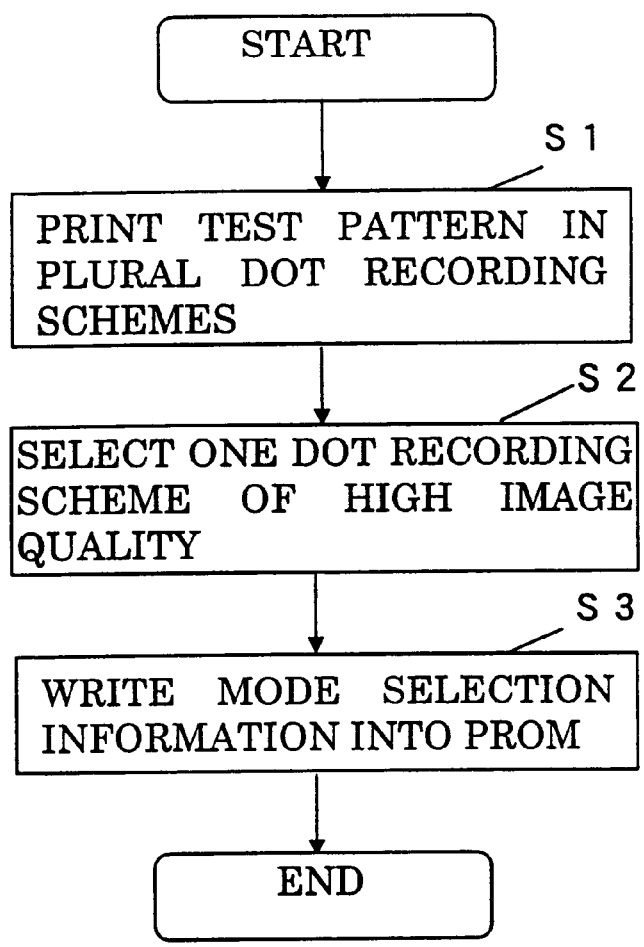
FIG. 20 is a flowchart showing one procedure of selecting a desired dot recording scheme.

FIG. 20 is a flowchart showing a procedure of selecting a desired dot recording scheme. At step S1, a predetermined test pattern (a test image) is printed with the color printer 22 according to a plurality of dot recording schemes, respectively, which have at least an identical resolution. As described previously, the scan parameters for the plurality of dot recording schemes are stored in either the PROM 42 (FIG. 2) in the color printer 22 or the printer driver 96 (FIG. 1). In the structure of FIG. 6, the scan parameters with respect to the plurality of dot recording schemes are stored in the recording mode table 206.

At step S2, the inspector observes the plurality of printed test patterns and selects the dot recording scheme that attains an image of the highest quality. The test image used here is an image that may cause a conspicuous banding (a streak-like poor image quality portion extending in the main scanning direction) according to the actual nozzle positions. Available examples of the test image include a gray pattern (an image of a single color) having a uniform density of about 50% to 70%, a gray scale (an image including an array of areas (patches) having different densities), and an image of uniform flesh tint.

At step S3, an inspector specifies a desired dot recording scheme with non-illustrated input means of the computer 90, such as a keyboard and a mouse. The mode selection information writing module 110 (FIG. 1) of the printer driver 96 writes and registers mode selection information (or head ID) representing the specified, desired dot recording scheme into the PROM 42 of FIG. 2 (the head ID memory 202 of FIG. 6).

Figure 21:
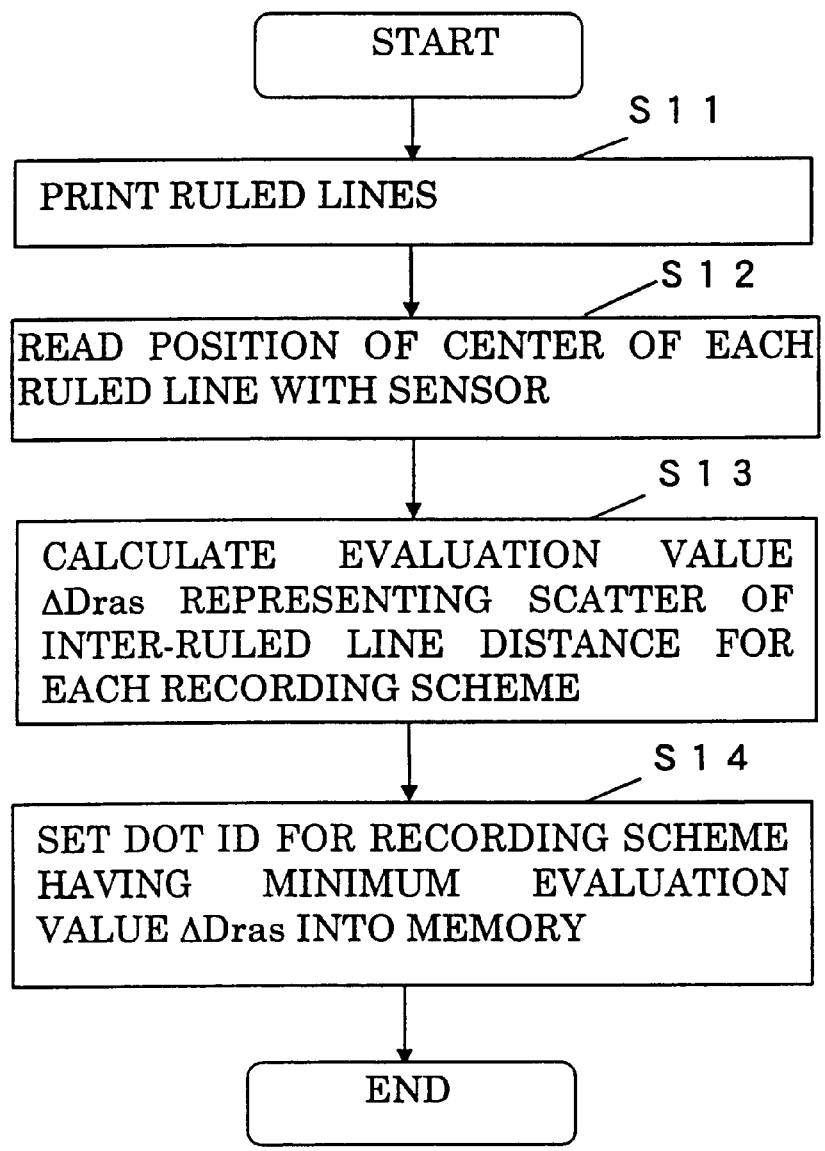
FIG. 21 is a flowchart showing another procedure of selecting a desired dot recording scheme.

FIG. 21 is a flowchart showing another procedure of selecting a desired dot recording scheme. At step S11, lateral ruled lines (ruled lines in the main scanning direction) is printed as the test image. The processing of step S11 corresponds to the processing of step S1 in the flowchart of FIG. 20.

Figure 22:
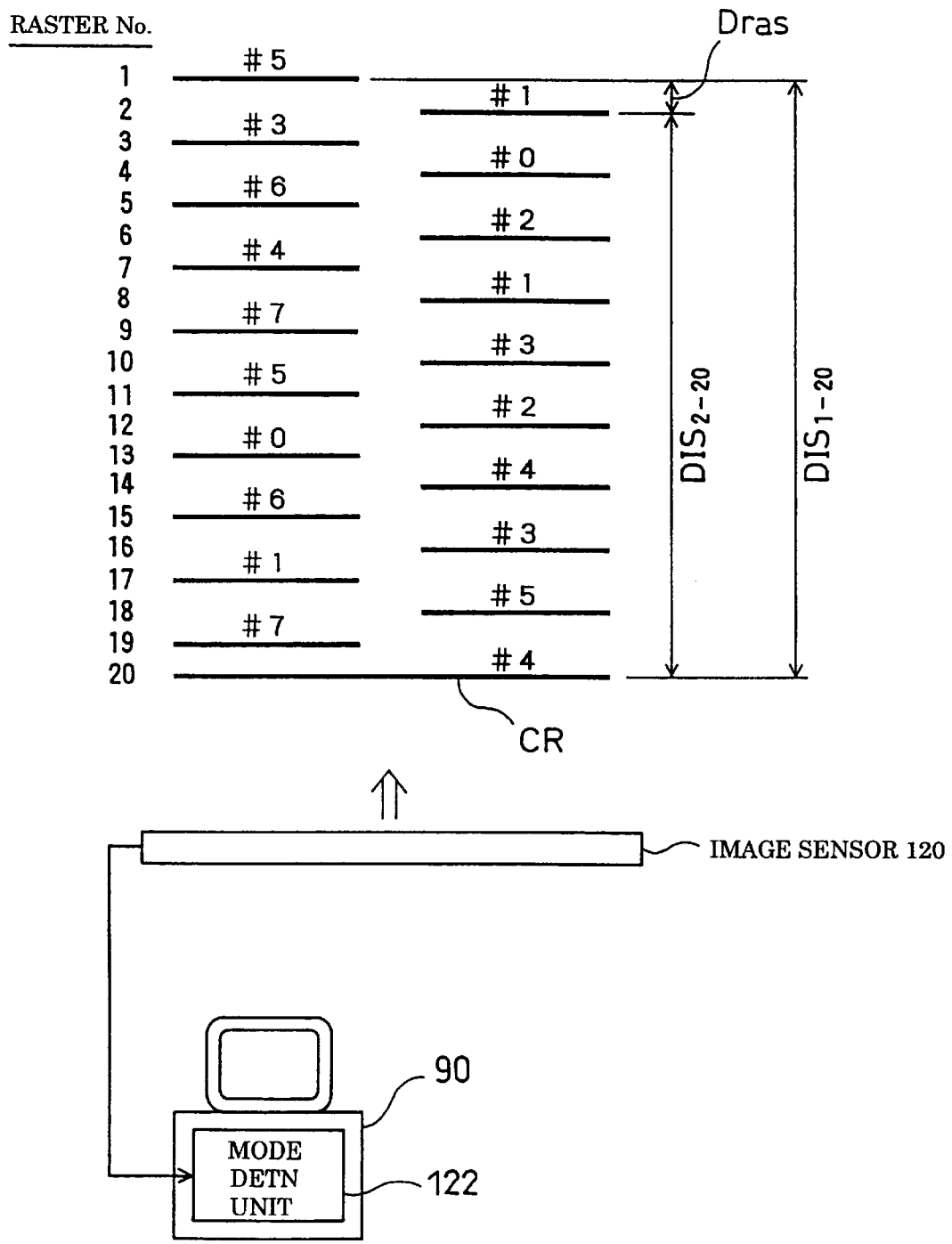
FIG. 22 shows an example of ruled lines recorded by the procedure of FIG. 21 and a method of reading the ruled lines.

FIG. 22 shows an example of lateral ruled lines recorded according to the procedure of FIG. 21 and a method of reading the lateral ruled lines. The upper portion of FIG. 22 illustrates an example of twenty lateral ruled lines recorded according to the first dot recording scheme for k=4 discussed above, and shows which nozzles are used to record the respective ruled lines. The lower portion of FIG. 22 shows a linear image sensor 120 and a mode determination unit 122 used for this processing. The computer 90 executes a computer program to embody the mode determination unit 122.

The raster numbers and the nozzle numbers (#0 through #7) shown in FIG. 22 correspond to those in FIG. 11 discussed previously. In the example of FIG. 22, the ruled lines on the odd numbered raster lines are recorded on the left-hand side of the printing paper, whereas the ruled lines on the even numbered raster lines are recorded on the right-hand side of the printing paper. This is because it is difficult to discriminate the adjoining ruled lines when the ruled lines on the adjoining raster lines are recorded in a laterally equal range. Because of this reason, the lateral range for recording the ruled lines may be divided into three, instead of two. Only one ruled line on the lower-most end (the ruled line on the 20th raster line) is recorded over the length including the ranges of the ruled lines on the odd numbered and even numbered raster lines. The ruled line on the 20th raster line is hereinafter referred to as the "common ruled line CR".

At step S12 of FIG. 21, the image sensor 120 (FIG. 22) reads the positions of the centers of the plurality of ruled lines. The image sensor 120 used here may be a linear image sensor including CCDs or a two-dimensional image sensor. The image sensor 120 may be incorporated in the printer 22 or in an image scanner that is separate from the printer 22. The arrangement of the image sensor 120 in the printer 22 has an advantage of enabling the positions of ruled lines to be read in the course of printing the ruled lines.

In accordance with one possible application, for example, the mode determination unit 122 executes a core line extraction process for each ruled line obtained by the image sensor 120 and thereby determines the position of the center of the ruled line. The position of the center of each ruled line is measured as a distance DIS from the common ruled line CR. By way of example, the positions of the ruled lines on the first and second raster lines in FIG. 22 are respectively measured by distances $DIS_{1-20}$ and $DIS_{2-20}$ from the common ruled line CR.

At step S13 of FIG. 21, the mode determination unit 122 calculates an evaluation value ΔDras with respect to a scatter of inter-ruled line distances for each recording scheme. The "inter-ruled line distance" here denotes the distance between two ruled lines on the adjoining raster lines. For example, the inter-ruled line distance Dras between the ruled lines on the first and second raster lines in FIG. 22 is calculated as the difference between the distances $DIS_{1-20}$ and $DIS_{2-20}$ from the common ruled line CR.

The combination of two nozzle numbers for recording the adjoining raster lines depends upon the dot recording scheme. This is understood from the fact that the seventh and eighth dot recording schemes for k=4 shown in FIGS. 18 and 19 have different combinations of two nozzle numbers for recording adjoining raster lines. Moreover, there are a finite number of combinations of nozzle numbers for recording the adjoining raster lines for a specific dot recording scheme. At step S13 in FIG. 21, the inter-ruled line distances Dras are measured for all the possible combinations of the nozzle numbers for recording the adjoining raster lines in each dot recording scheme.

Figure 23:
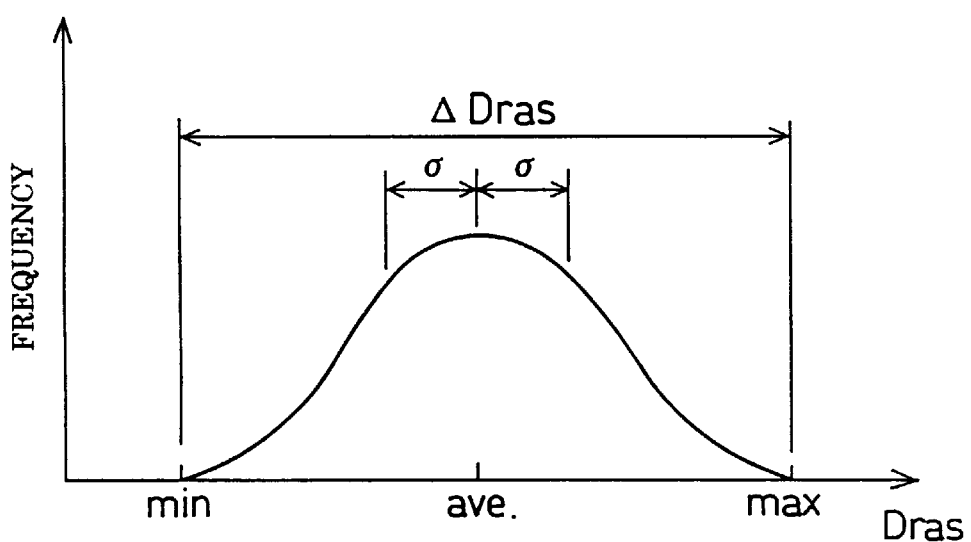
FIG. 23 is a graph showing a frequency distribution of inter-line distance Dras obtained with respect to one dot recording scheme.
Figure 27:
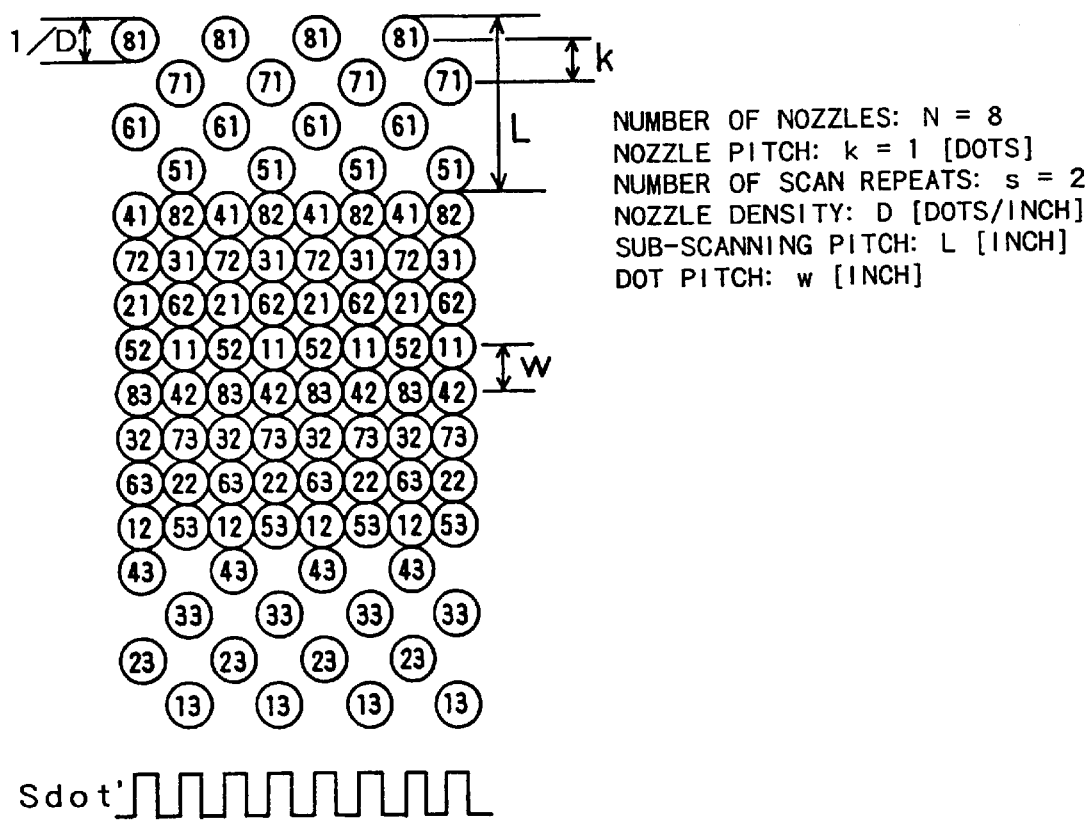
FIG. 27 shows a conventional overlap recording scheme.

FIG. 23 is a graph showing a frequency distribution of the inter-ruled line distance Dras obtained for one dot recording scheme. As shown in FIG. 23, it is expected that the inter-ruled line distance Dras has a frequency distribution approximated by a normal distribution. The difference ΔDras between the maximum and minimum of the inter-ruled line distance Dras may be used as the evaluation value with respect to the scatter of the inter-ruled line distances Dras. A standard deviation σ or a variance of the frequency distribution of the inter-ruled line distance Dras may also be used as the evaluation value with respect to the scatter of the inter-ruled line distances Dras. The greater difference ΔDras or standard deviation a or variance increases the variation in the inter-ruled line distance. The banding (a streak-like poor image quality portion extending in the main scanning direction) readily occurs when the inter-raster distance (this is equal to the inter-ruled line distance) is not constant but varied. This means that the greater evaluation value with respect to the scatter of the inter-ruled line distances tends to readily cause the banding. As clearly understood from this explanation, a variety of statistical values representing the scatter (or variation) of the inter-ruled line distances Dras may be used as the evaluation value of the image quality based on the ruled lines pattern.

In the above example, the distance between two ruled lines on the adjoining raster lines is used as the inter-ruled line distance Dras. The distance between two ruled lines apart by a plurality of raster lines may be used instead. For example, a distance between two ruled lines apart by four raster lines and a distance between two ruled lines apart by six raster lines are applicable. The reason for taking this arrangement is as follows. An increase in recording resolution in the sub-scanning direction narrows the width of one raster line and causes the banding to be conspicuous when the distance between several raster lines is varied. In such cases, the arrangement of measuring the distance between two ruled lines that are apart by a plurality of raster lines and using the statistical value representing the scatter of the distances as the evaluation value of the image quality enables selection of the dot recording scheme that hardly causes the conspicuous banding.

At step S14 of FIG. 21, the mode determination unit 120 compares the evaluation values ΔDras with respect to the scatter of the inter-ruled line distances obtained for a plurality of dot recording schemes, selects the dot recording scheme having the minimum evaluation value ΔDras, and sets the head ID of the selected dot recording scheme in the head ID memory 202. The processing of step S14 corresponds to that of step S3 in the flowchart of FIG. 20.

FIG. 24 shows another example of lateral ruled lines and the method of reading the lateral ruled lines. The upper portion of FIG. 24 shows an example of lateral ruled lines recorded with all the nozzles included in a nozzle array for one color. It is here assumed that the nozzle array includes eight nozzles having the nozzle numbers #0 through #7. The even numbered nozzles record ruled lines on the left-hand side of the printing paper, whereas the odd numbered nozzles record ruled lines on the right-hand side of the printing paper. One ruled line on the lower-most end (that is, the ruled line recorded by the nozzle #7) is the common ruled line CR. These ruled lines are recorded simultaneously in one main scan. The distance between the adjoining ruled lines is accordingly equal to the nozzle pitch k [dots]. Like the example of FIG. 22, the lateral range for recording the ruled lines may be divided into three, instead of two.

The processing similar to that of FIG. 21 is carried out for the ruled lines shown in FIG. 24. At step S12, the centeral position of each ruled line in FIG. 24 is measured by the distance DIS from the common ruled line CR. For example, the positions of the ruled lines recorded by the nozzles having the nozzle numbers #0 and #1 are measured respectively by distances $DIS_{0-7}$ and $DIS_{1-7}$ from the common ruled line CR.

In the case of the ruled lines shown in FIG. 24, the determination of the inter-ruled line distance Dras at step S13 is implemented by a slightly different process from that in the case of FIG. 22. In the actual printing state, the combination of the nozzles for recording adjoining raster lines depends upon the dot recording scheme, and there are a finite number of combinations of the nozzle numbers for recording adjoining raster lines for each dot recording scheme. In the case of the ruled lines as shown in FIG. 24, the inter-ruled line distances Dras are calculated according to the combination of the nozzle numbers for recording adjoining raster lines in the actual recording state. In the example of FIG. 11, the first raster line is recorded by the nozzle #5 after the 0th sub-scan feed, and the second raster line is recorded by the nozzle #1 after the 2nd sub-scan feed. The inter-ruled line distance Dras between the first and second raster lines is given by the following equation:

$$Dras = DIS_{5-7} - DIS_{1-7} + \Sigma L \cdot w$$

where $DIS_{5-7}$ and $DIS_{1-7}$ denote the distances between the common ruled line CR and the respective ruled lines recorded by the nozzles #5 and #1 in FIG. 24, ΣL denotes the summation of the sub-scan feed amounts between recording of the first and second raster lines in the actual recording state, and w denotes the dot pitch [inches]. In this example, the first raster line is recorded after the 0th sub-scan feed and the second raster line is recorded after the 2nd sub-scan feed, so that ΣL denotes the summation of the sub-scan feed amounts from the 0th sub-scan feed to the 2nd sub-scan feed. As shown in FIG. 10(A), the summation ΣL of the sub-scan feed amounts from the 0th sub-scan feed to the 2nd sub-scan feed is equal to 17 dots.

The inter-ruled line distance Dras between another pair of adjoining raster lines is calculated in a similar manner. Measurement of the distances $DIS_{0-7}$ through $DIS_{6-7}$ for all the ruled lines recorded as shown in FIG. 24 enables the inter-ruled line distance Dras between any pair of adjoining raster lines to be calculated in any dot recording schemes. This gives the distribution of the inter-ruled line distance Dras as shown in FIG. 23 with respect to each dot recording scheme. The processing after the calculation of the inter-ruled line distance Dras is identical with the processing of FIG. 22 and is thus not specifically described here.

There are two primary causes of the banding: the sub-scan feed error and the manufacturing error of the nozzle pitch. When the banding is mainly ascribed to the sub-scan feed error, it is desirable to measure the distance between the lateral ruled lines recorded according to the actual dot recording scheme as shown in FIG. 22. When the banding is mainly ascribed to the manufacturing error of the nozzle pitch, on the other hand, the arrangement of recording the lateral ruled lines in one main scan with all the nozzles for one color and measuring the distances between the lateral ruled lines as shown in FIG. 24 enables the suitability of each dot recording scheme to be determined with a sufficient accuracy.

FIGS. 25(A) and 25(B) show another method of evaluation the image quality. FIG. 25(A) shows the process of measuring the density of a uniform-density gray image GI, which is recorded as a test pattern, in the sub-scanning direction y with the image sensor 120. FIG. 25(B) shows a distribution of the density D thus obtained. The difference ΔD between the maximum and the minimum of the density D may be used as the evaluation value of the image quality. The image having the smaller difference ΔD has the less unevenness of the density and the higher image quality, so that it is preferable to select the dot recording scheme having the minimum difference ΔD. A densitometer may be used for measuring the density, instead of the image sensor 120.

The arrangement of reading the test image with some sensor and evaluating the image quality according to the outputs of the sensor enables the desired dot recording scheme to be selected automatically without requiring an inspector or a user to observe the test image.

It is preferable that selection of a desired dot recording scheme is carried out for each combination of the resolution and the recording speed. When there are plural combinations of the resolution and the recording speed as possible choices in the color printer 22, it is preferable to select one desired dot recording scheme for each combination. If the difference in recording speed is insignificant, one desired recording scheme may be selected among the plurality of dot recording schemes having an identical resolution, irrespective of the recording speed.

The procedure of either FIG. 20 or FIG. 21 may be executed at any of the following occasions:

(1) at the time of manufacturing the print head 28;

(2) at the time of manufacturing the color printer 22; and (3) at the time of use by the user.

By way of example, execution of the procedure of either FIG. 20 or FIG. 21 at the occasion (2), that is, at the time of manufacturing the color printer 22, enables the desired dot recording scheme for attaining high image quality to be set for each color printer 22 to be delivered. Since the performances of the color printer 22 change with an elapse of time, there is a possibility that a desired dot recording scheme for attaining high image quality is changed after the long-term use. The arrangement of enabling a desired dot recording scheme to be changed after the start of using the color printer 22 prevents the deterioration of the image quality due to the time-dependent variation to some extent. From that point of view, it is desirable to allow the execution of the procedure of either FIG. 20 or FIG. 21 even at the occasion (3).

In this embodiment, the mode selection information for specifying the desired dot recording scheme is stored in the rewritable PROM 42. This arrangement enables the mode selection information representing the desired dot recording scheme to be stored in the color printer 22 and allows the mode selection information to be changed if required.

The mode selection information (the head ID) may be set in a variety of forms, other than being stored in the PROM 42 in the printer 22. For example, the head ID may be set in a distinguishable manner as an electric contact or a projection on the print head 28, and the printer 22 has an element (a circuit or a switch) for identifying this head ID. The means for setting the mode selection information is not restricted to the memory, but a variety of configurations, such as an electric contact and a mechanical structure, may be adopted.

As described previously, the printer driver 96 reads the parameters of the desired dot recording scheme from the PROM 42 when the printer driver 96 is installed at the time of starting the computer 90. In other words, the printer driver 96 reads the dot recording mode information corresponding to the desired dot recording mode specified by the mode selection information (head ID) from the PROM 42. The processing in the rasterizer 97 and the halftone module 99 and the operations of main scan and sub-scan are carried out according to the dot recording mode information.

The timing of reading the parameters of the desired dot recording scheme from the PROM 42 is not restricted to the time of installing the printer driver 96, but there may be a variety of modifications. For example, the parameters may be read at every time of supplying power to the computer 90. Even when the printer 22 is replaced by a new one, this arrangement enables the parameters of the desired dot recording scheme to be read from the PROM 42 in the newly replaced printer 22. In another possible application, the information from the PROM 42 may be read at every time when the printing operation is executed (for example, at every time when the user instructs a start of printing). This arrangement is preferable when a large number of printers of an identical model are connected via a network and one printer is selected for the actual printing operation. In this case, the parameters of the desired dot recording scheme are read from the PROM 42 of the selected printer at every time of executing the printing operation. This enables recording of an image according to the dot recording scheme suitable for the selected printer.

When all sets of the dot recording mode information have been registered in advance in the printer driver 96, the printer driver 96 is required to read only the mode selection information from the PROM 42. If a reading error of the mode selection information occurs, for example, because of unsuccessful bilateral data communication, this arrangement deals with the reading error in the following manner. In response to the reading error, this arrangement causes the printer to print the mode selection information (that is, the head ID) on a printing medium and gives a display that requires the user to input the printed mode selection information (the head ID) on a user interface of the printer driver 96 (that is displayed on the screen of the computer 90). For example, a sentence such as "Input the head ID printed by the printer from the keyboard." may be displayed in the user interface area on the screen. This enables the printer driver 96 to carry out a variety of processes with the parameters of the dot recording scheme specified by the mode selection information input by the user.

As described above, the embodiment enables a desired dot recording scheme for attaining high image quality to be selected among the plurality of dot recording schemes which have at least an identical resolution. The arrangement of the embodiment enables a high quality image to be recorded according to the state of each individual color printer 22.

When there are a plurality of equivalent dot recording schemes that have an identical resolution and an identical recording speed but different sequences of the sub-scan feed amounts L, like the first and second dot recording schemes for k=4, the arrangement of enabling a high quality image to be recorded according to the state of each individual printer is especially advantageous.

The present invention is not restricted to the above embodiments or their applications, but there may be many modifications, changes, and alterations without departing from the scope or spirit of the main characteristics of the present invention. Some examples of possible modification are given below.

Although the above embodiments are concerned with dot recording schemes for one color, application of the dot recording scheme to each color will implement color printing with plural colors of inks.

The principle of the present invention is applicable not only to the color printing but to the monochrome printing. The present invention is also applicable to the printing that expresses each pixel with a plurality of dots to attain multi-tones. The present invention is further applicable to drum scan printers. In the drum scan printer, the rotating direction of the drum corresponds to the main scanning direction, and the feeding direction of the carriage corresponds to the sub-scanning direction. The present invention is applicable not only to the ink jet printers but in general to any dot recording apparatuses that record dots on the surface of a printing medium with a recording head having plural arrays of dot-forming elements. The "dot-forming elements" here denote elements for forming the dots, such as the ink nozzles in the ink jet printer.

The structure embodied by hardware circuitry in the above embodiments can be replaced by software, and on the contrary, the structure embodied by software can be replaced by hardware circuitry. For example, the function of the control circuit 40 of the color printer 22 (FIG. 2) may be implemented by the computer. In this case, a-computer program such as the printer driver 96 executed the same control function as that of the control circuit 40.

The computer programs for implementing those functions are provided as stored on a computer readable medium, such as floppy disks or CD-ROMs. The computer 90 reads the computer programs from the storage medium and transfer them to the internal storage device or to the external storage device. Alternatively the computer programs may be supplied from a program supply apparatus to the computer 90 via a communications path. At the time of executing the functions of the computer programs, the programs stored in the main memory are executed by the microprocessor of the computer 90. Alternatively, the computer 90 may read out computer programs stored on the storage medium to directly execute it.

In the specification hereof, the term computer 90 implies both the hardware and its operating system and more specifically represents the hardware operating under the control of the operating system. The computer programs cause the computer 90 to implement the above functions. Part of these functions may be implemented by the operating system instead of the applications programs.

The "computer readable medium" in the present invention is not restricted to the portable storage medium, but includes a variety of internal storage devices in the computer, for example, RAMs and ROMs, and external storage devices connected with the computer, for example, hard disks.

INDUSTRIAL APPLICABILITY

The present invention may be applicable to ink-jet type monochrome printers and color printers, and to any recording apparatuses that use a recording head having plural arrays of dot-forming elements.

What is claimed is:

1. A dot recording apparatus for recording dots on a surface of a printing medium with a dot recording head, the dot recording apparatus comprising:
    a dot-forming element array arranged on the dot recording head to face the printing medium, the dot-forming element array comprising a plurality of dot-forming elements for forming a plurality of dots of an identical color at a substantially constant pitch in a sub-scanning direction;
    a main scan driving unit that drives at least one of the dot recording head and the printing medium to carry out main scan;
    a head driving unit that drives at least part of the plurality of dot-forming elements to form dots in a course of the main scan;
    a sub-scan driving unit that drives at least one of the dot recording head and the printing medium every time when the main scan is completed, thereby carrying out sub-scan; and
    a control unit that controls the above units;
    wherein the control unit comprises:
    a recording mode storage unit that stores a plurality of dot recording modes having a substantially equal recording speed, as alternative dot recording modes each defining operations of the main scan and the sub-scan for recording dots at an identical recording resolution;
    a mode selection information setting unit, in which mode selection information is set to specify a desired dot recording mode among the plurality of dot recording modes; and
    a unit that executes the dot recording according to the desired dot recording mode specified by the mode selection information.

2. A dot recording apparatus in accordance with claim 1, wherein the plurality of dot recording modes are different from each other in a sequence of sub-scan feed amounts.

3. A dot recording apparatus in accordance with claim 1, wherein the plurality of dot recording modes are different from each other in positions of dot-forming elements used for each main scan while a number of the dot-forming elements used is common to the plurality of dot recording modes.

4. A dot recording apparatus in accordance with claim 1, wherein the mode selection information setting unit is a rewritable non-volatile memory.

5. A dot recording apparatus in accordance with claim 1, the dot recording apparatus further comprising:
    a sensor for capturing a plurality of recorded test images, which are obtained by recording a specific test image in the plurality of dot recording modes, respectively; and
    a mode determination unit that analyzes outputs of the sensor to thereby select the desired dot recording mode among the plurality of dot recording modes.

6. A dot recording apparatus in accordance with claim 2, wherein the mode selection information setting unit is a rewritable non-volatile memory.

7. A method of recording dots on a surface of a printing medium with a dot recording head while carrying out a main scan in a direction substantially perpendicular to a sub-scanning direction, the dot recording head having a dot-forming element array including a plurality of dot-forming elements for forming a plurality of dots of an identical color arranged at a substantially constant pitch in the sub-scanning direction, the method comprising the steps of:
    (a) recording a specific test image in a plurality of dot recording modes that have a substantially equal recording speed, the plurality of dot recording modes defining operations of the main scan and the sub-scan for recording dots at an identical recording resolution;
    (b) selecting among the plurality of dot recording modes a desired dot recording mode corresponding to a desired recorded test image which has been selected out of a plurality of recorded test images recorded in the plurality of dot recording modes;
    (c) setting mode selection information for specifying the desired dot recording mode; and
    (d) recording dots according to the desired dot recording mode specified by the mode selection information.

8. A method in accordance with claim 7, wherein the plurality of dot recording modes are different from each other in a sequence of sub-scan feed amounts.

9. A method in accordance with claim 7, wherein the plurality of dot recording modes are different from each other in dot-forming elements used for each main scan while a number of the dot-forming elements used is common to the plurality of dot recording modes.

10. A method in accordance with claims 7 or 8, wherein the mode selection information is stored in a rewritable non-volatile memory.

11. A method in accordance with claim 7, wherein the step (b) comprises the steps of:
    capturing the plurality of recorded test images with a sensor; and
    analyzing outputs of the sensor to thereby select the desired dot recording mode among the plurality of dot recording modes.

12. A computer program product storing a computer program for causing a printing apparatus to record dots on a surface of a printing medium while carrying out a main scan in a direction substantially perpendicular to a sub-scanning direction, the printing apparatus comprising a dot recording head having a dot-forming element array including a plurality of dot-forming elements for forming a plurality of dots of an identical color arranged at a substantially constant pitch in the sub-scanning direction, the computer program product comprising:
    a computer readable medium; and
    a computer program stored on the computer readable medium;
    wherein the computer program comprises:
    a first program code that causes a computer to read a desired dot recording mode from a first storage unit for storing a plurality of dot recording modes according to mode selection information which has been set in advance for specifying the desired dot recording mode among the plurality of dot recording modes; and a second program code that causes the computer to execute dot recording according to the desired dot recording mode specified by the mode selection information.

13. A computer program product in accordance with claim 12, wherein the plurality of dot recording modes are different from each other in a sequence of sub-scan feed amount.

14. A computer program product in accordance with claim 12, wherein the plurality of dot recording modes are different from each other in dot-forming elements used for each main scan while a number of the dot-forming elements used is common to the plurality of dot recording modes.

* * * * *